(12) United States Patent
Collins et al.

(10) Patent No.: US 7,167,127 B2
(45) Date of Patent: Jan. 23, 2007

(54) PROCESS FOR TRACKING VEHICLES

(75) Inventors: Noel Collins, Melbourne, FL (US);
Rick Bottone, Melbourne, FL (US);
Donald R. McMillan, Indialantic, FL (US)

(73) Assignee: Northrop Grumman Corporation, Los Angeles, CA (US)

( * ) Notice: Subject to any disclaimer, the term of this patent is extended or adjusted under 35 U.S.C. 154(b) by 291 days.

(21) Appl. No.: 10/983,557

(22) Filed: Nov. 8, 2004

(65) Prior Publication Data
US 2006/0097910 A1  May 11, 2006

(51) Int. Cl.
*G01S 13/52* (2006.01)
(52) U.S. Cl. .................. 342/160; 342/90; 342/162; 342/189; 342/195
(58) Field of Classification Search .............. 342/29, 342/41, 70, 62–63, 90, 160, 162, 189, 190, 342/192, 195
See application file for complete search history.

(56) References Cited

U.S. PATENT DOCUMENTS

| | | | | |
|---|---|---|---|---|
| 5,408,414 A | 4/1995 | Nomoto et al. | ............. | 364/449 |
| 5,497,158 A * | 3/1996 | Schmid et al. | ................ | 342/90 |
| 5,761,326 A | 6/1998 | Brady et al. | ................ | 382/103 |
| 6,222,481 B1 * | 4/2001 | Abrahamson et al. | ........ | 342/90 |
| 6,415,226 B1 | 7/2002 | Kozak | ........................ | 701/210 |
| 6,420,997 B1 | 7/2002 | Cong | ........................... | 342/70 |
| 6,487,500 B2 | 11/2002 | Lemelon et al. | ............ | 701/301 |
| 6,650,972 B1 | 11/2003 | Robinson et al. | .............. | 703/3 |
| 6,707,418 B2 * | 3/2004 | Hassebrock et al. | ........ | 342/189 |
| 7,002,509 B2 * | 2/2006 | Karlsson | ....................... | 342/90 |
| 2002/0147544 A1 | 10/2002 | Nicosla et al. | ............. | 701/207 |
| 2003/0078754 A1 | 4/2003 | Hamza | ........................ | 702/150 |
| 2003/0184468 A1 | 10/2003 | Chen et al. | ................... | 342/52 |
| 2005/0264438 A1 * | 12/2005 | Fullerton et al. | ............. | 342/28 |
| 2005/0285774 A1 * | 12/2005 | Wittenberg et al. | ........... | 342/70 |

* cited by examiner

*Primary Examiner*—Thomas H. Tarcza
*Assistant Examiner*—Isam Alsomiri
(74) *Attorney, Agent, or Firm*—Louis L. Dachs

(57) ABSTRACT

The invention is process for tracking a moving targeted vehicle from a remote sensor platform comprising the steps of 1) tracking the targeted vehicle and periodically recording its radar signature until its identity becomes ambiguous, 2) tracking the target after it has left its ambiguous state and periodically recording its radar signature; and 3) comparing the recorded radar signatures prior to the targeted vehicle becoming ambiguous to the recorded radar signature taken after the targeted vehicle has left its ambiguous state and determining that the targeted vehicle now tracked is the same as the targeted vehicle being tracked prior to becoming ambiguous.

10 Claims, 37 Drawing Sheets

TRACK MAINTENANCE ARCHITECTURE

KINEMATIC TRACKER OUTPUT
(ESTIMATE OF VEHICLE POSITION OR TRACK)

$$X_{(4\times1)} = \begin{matrix} X \\ Y \end{matrix} \} (M) \\ \begin{matrix} X' \\ Y' \end{matrix} \} (M/SEC)$$

F1

```
                Y(NORTH)
X(WEST)  ←———————•———————→  X(EAST)
                Y(SOUTH)
```

$$P_{(4\times4)} = \begin{matrix} X \\ Y \\ X' \\ Y' \end{matrix} \begin{bmatrix} P_{XX} & P_{XY} & P_{XX'} & P_{XY'} \\ P_{XY} & P_{YY'} & P_{YX'} & P_{YY'} \\ P_{XX'} & P_{YX'} & P_{X'X'} & P_{X'Y'} \\ P_{XY'} & P_{YY'} & P_{X'Y'} & P_{Y'Y'} \end{bmatrix}$$

$$\begin{array}{cccc} X & Y & X' & Y' \end{array}$$

WHERE:

$X_{4\times1}$ = TRACK MATRIX $P_{(4\times4)}$ = COVARIANCE MATRIX $P_{XX}$ = VARIANCE OF X ESTIMATE (METER$^2$)

$P_{Y'Y'}$ = VARIANCE OF Y' ESTIMATE (METER SEC$^2$)

BASICS

■ SENSOR MODES TO COMMAND
  — HUR
  — HRR
  — MTI

■ TRACK SRM STATUS
  — WEAPON DELIVERY
  — NOMINATED TRACK
  — TRACK AMBIGUOUS WITH NOMINATED TRACK
  — POTENTIAL CONFUSER
  — SURVEILLANCE

● SRM TASKS
  — IMPROVE KINEMATIC QUALITY
  — DISAMBIGUATE TRACKS
  — POPULATE THE "ON THE FLY" DATABASE

| | SENSOR MODE OPTIONS | | |
|---|---|---|---|
| | HUR | HRR | MTI |
| WEAPON TERMINAL DELIVERY | ● | | |
| NOMINATED TRACK | ● | ● | ● |
| AMBIGUOUS WITH NOMINATED TRACK | ● | ● | ● |
| POTENTIAL CONFUSER | ● | ● | ● |
| SURVEILLANCE | | ● | ● |

MEMBERSHIP FUNCTION (M18)
LONG TIME SINCE LAST MEASUREMENT

MEMBERSHIP M20
HEADING UNCERTAINTY BIG

GOOD MULTI-LATERATION ANGLE M31

POSITION UNCERTAINTY MEMBERSHIP FUNCTION M19

GOOD TRACK $\sigma_{R'}$ MSF37

AVAILABILITY OF HELPFUL ASPECT M12

VEHICLE ASPECT (VIEWING) ANGLES

NOT BAD SIDE POSE MSF M32

CLOSENESS TO NOMINATED TRACK
MEMBERSHIP FUNCTION M1

SAME HEADING
MEMBERSHIP FUNCTION M2

TTG TO COMMON INTERSECTION
MEMBERSHIP FUNCTION M4

IF TTG SMALL AND TTG SIMILAR,
THEN IS CONSIDERED CONFUSER TRACK

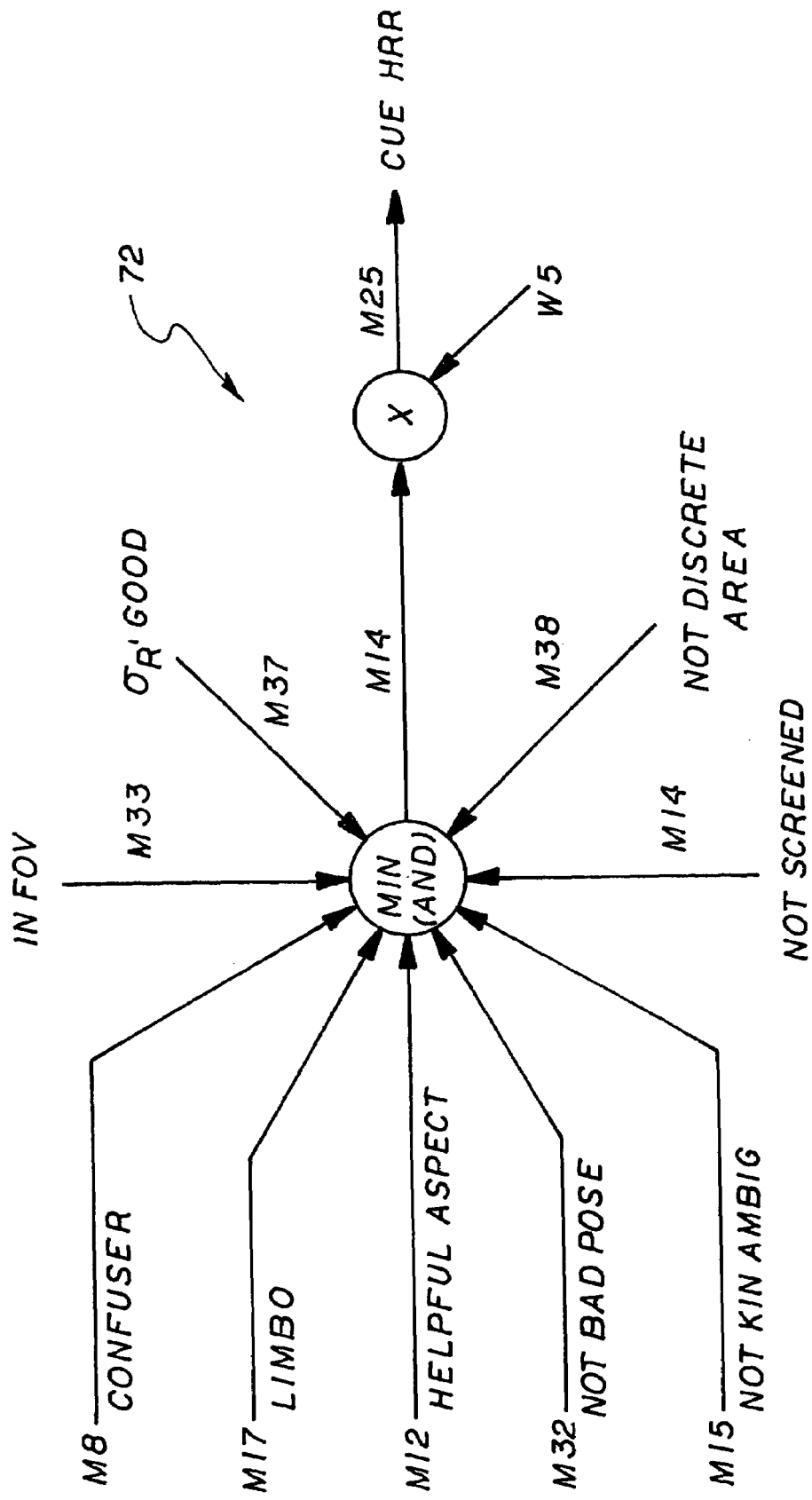

HOLES IN "ON THE FLY" DATABASE MSF M11

UNIQUENESS OF AVAILABLE ASPECT MEMBERSHIP M10

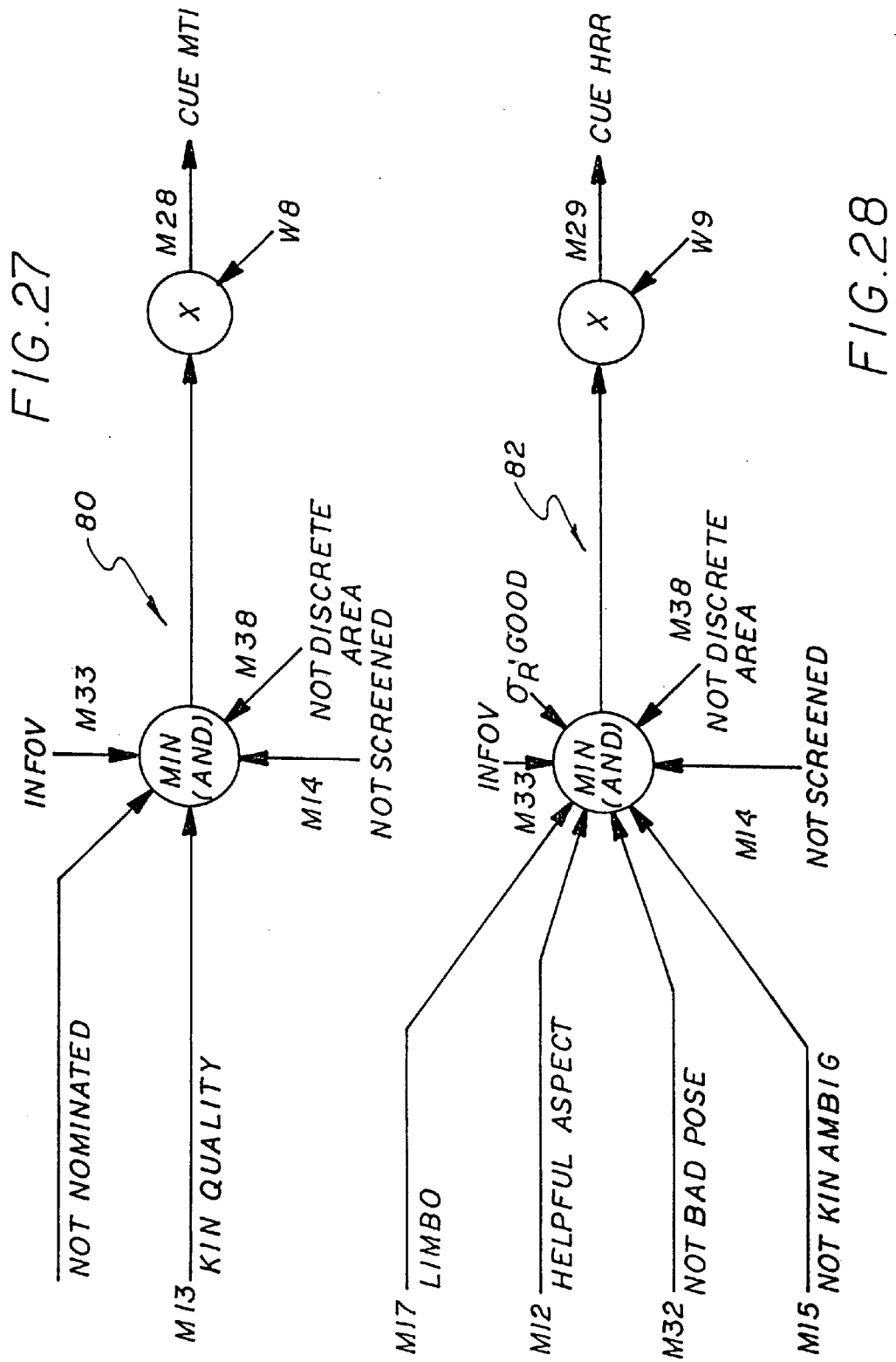

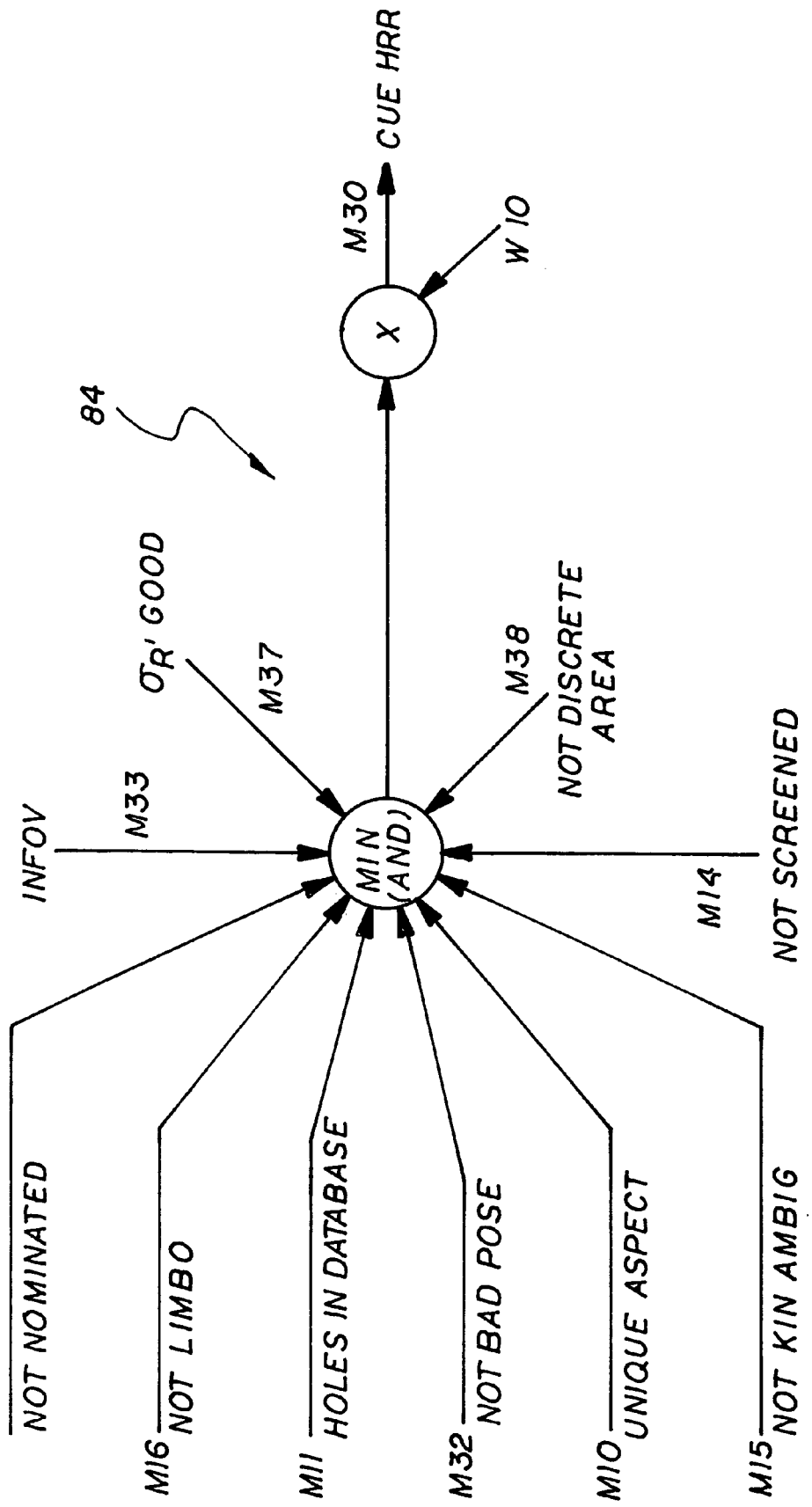

PROBLEM 1: SENSOR SCREENING

PROBLEM 2: INTERSECTION OF TRACKS

FIG. 38

VEHICLE1 @ 15M/S MEETS
VEHICLE2 @ 15M/S AFTER
100 SECONDS

CASE 2

TRACK1 HAS
SEEN TRACK2
ASPECT BEFORE
AND WOULD
NEGATIVE
PROFILE MATCH 102A
110A
(0M,0M)(300M,0M)
LIMBO
TRACK1 97A
VEHICLE1 96A 15 M/S
(0M,1500M)
(0M,-1500M)
UNAMBIGUOUS
(BUILT DATABASE)
VEHICLE2 96B 15 M/S
TRACK2 97B
AMBIGUOUS 98
(-300M,0M)
100B
102B

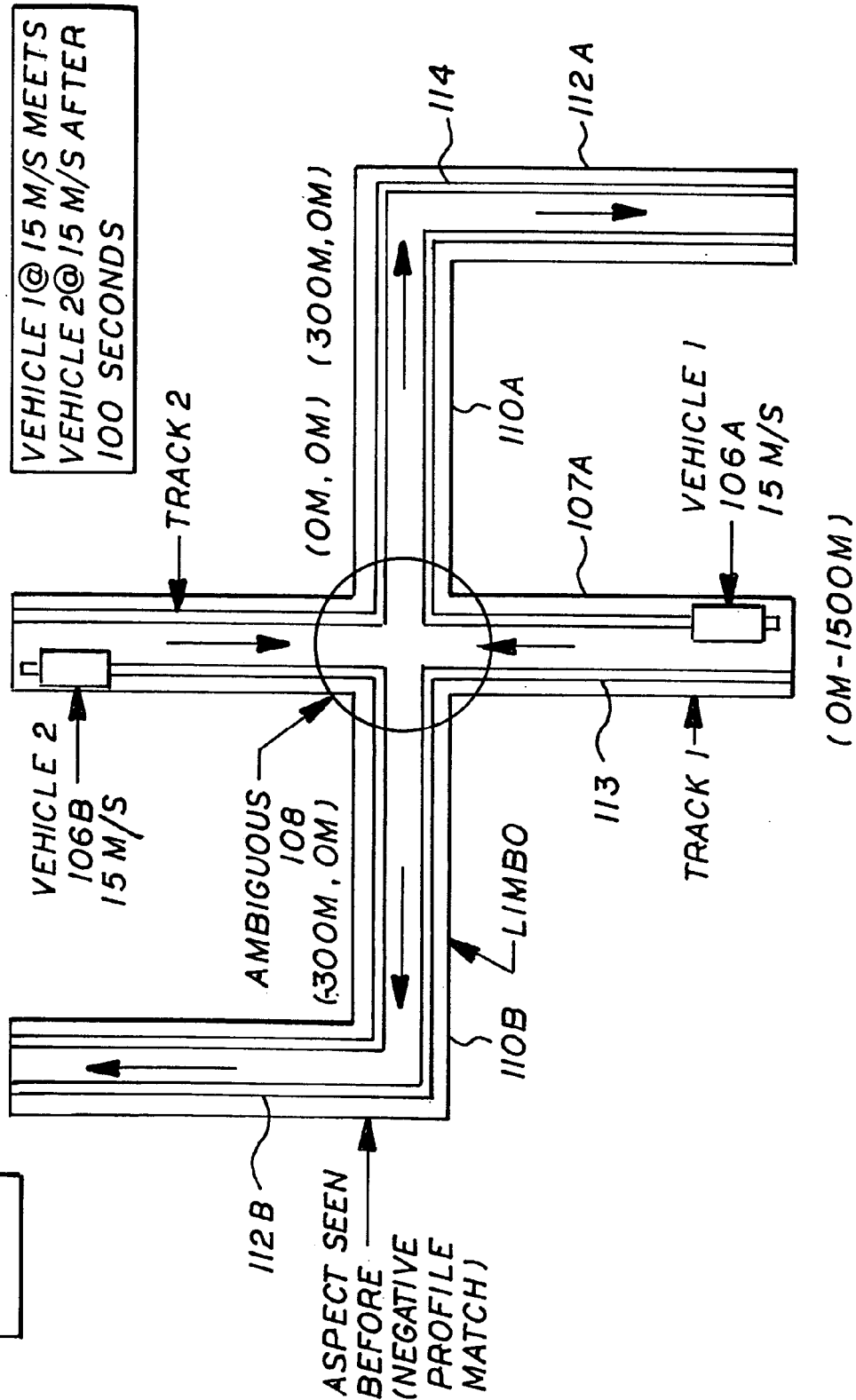

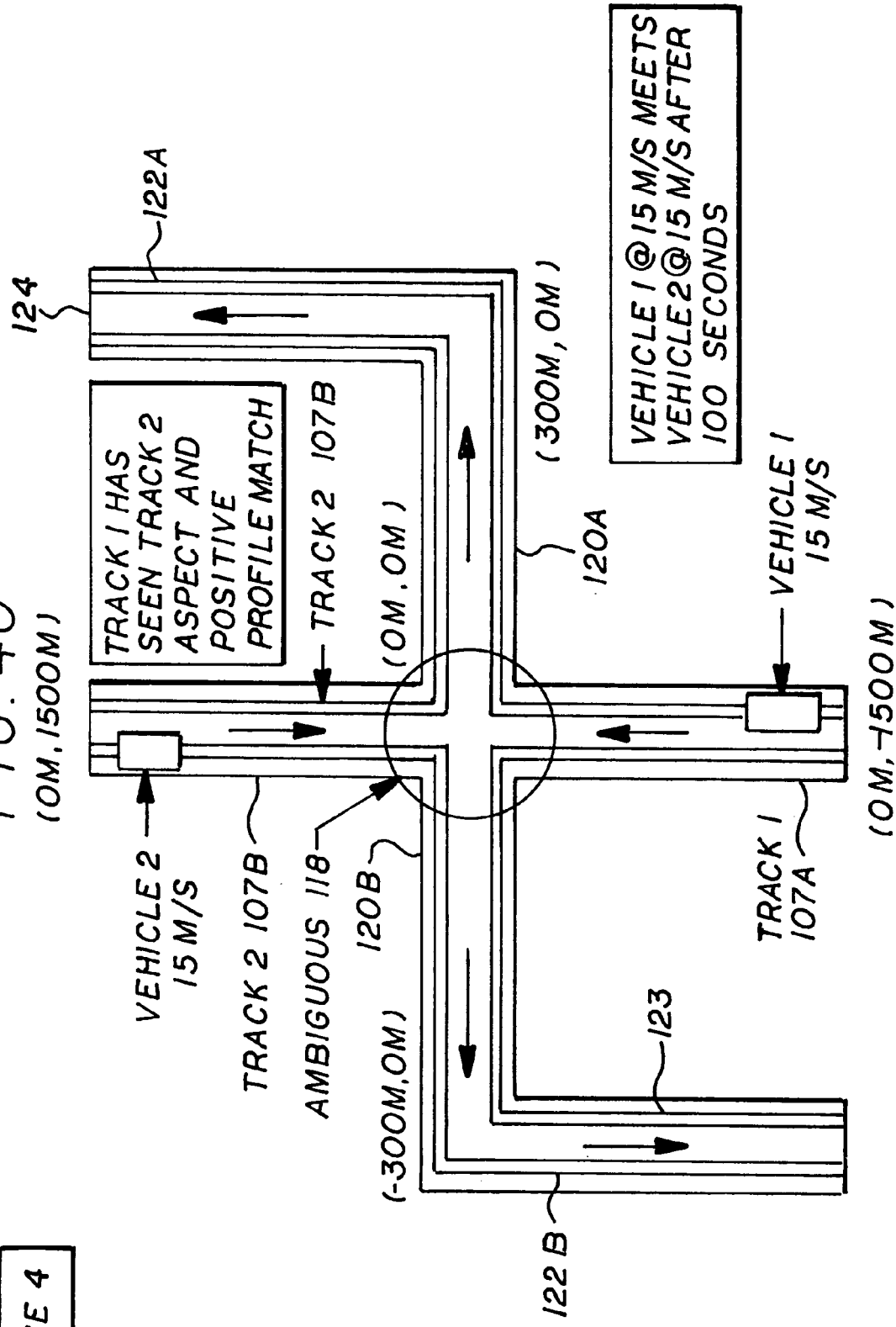

FIG. 41
FATS USES BOTH POSITIVE & NEGATIVE EVIDENCE
TO RESOLVE TRACKING DISAMBIGUATION

|  | COMPARE WITH SAME TRACK | COMPARE WITH OTHER TRACK |
|---|---|---|
| "SAME" DECLARATION | CASE 1<br>DISAMBIGUATE<br>(TRACK NOT SWAPPED) | CASE 4<br>DISAMBIGUATE<br>(TRACK SWAPPED) |
| "DIFFERENT" DECLARATION | CASE 3<br>ELIMINATE ALTERNATIVE<br>(TRACK SWAPPED) | CASE 2<br>ELIMINATE ALTERNATIVE<br>(TRACK NOT SWAPPED) |

FATS: DISAMBIGUATE  DISAMBIGUATE LOGIC  FIG. 42

```
CHANGE = FALSE
LOOP THRU TRACKS
  IF TRACK AMBIGUOUS WITH CORRELATED TRACK
    CALCULATE PROBABILITY OF FEATURE MATCH, PROBABILITY SAME, PROBABILITY
    DIFFERENT, PROBABILITY UNCERTAIN (SENSOR TO TRACK)
    IF PROBABILITIES CALCULATED (PROFILE AVAILABLE)
      TEST IS NEW PROFILE IS INDEPENDENT
        IF NOT INDEPENDENT THEN
          RETRACT OLD DEPENDENT DATA
        END
      EVIDENCE ACCUMULATE
      IF Ps>THRESHOLD 1
        MARK POSITIVE CORRELATION (AMBIGUOUS 2d MATRIX STRUCTURE
        MARK ALL OTHER ON ROWS, COLUMNS TO NO CORRELATION
        CHANGE = TRUE
      ELSE Pd >THRESHOLD 2
        MARK NEGATIVE CORRELATION (AMBIGUOUS 2d MATRIX STRUCTURE
        CHANGE = TRUE
      END
    END
  END
IF CHANGE = TRUE
  USE PROCESS OF ELIMINATION
  TRACK STITCH
END
```

WHERE
Ps = PROBABILITY SAME
Pd = PROBABILITY DIFFERENT
Pu = PROBABILITY UNCERTAIN

FIG. 43

FATS: PROBABILITY OF FEATURE MATCH LOGIC

PROBABILITY OF FEATURE MATCH LOGIC

PROBABILITY OF SAME (MATCH) = 0
IF VELOCITY > 0
 CALCULATE HEADING QUALITY, HQ
 IF HEADING QUALITY < THRESHOLD 1
  CALCULATE TRACK ASPECT ANGLE, TA
  ASPECT START = TA-HQ
  ASPECT END = TA+HQ
  FOR ASPECT, ASPECT START, ASPECT END HQ/16
   GET CLOSEST "ON THE FLY" PROFILE (WITHIN DELTA ASPECT THRASHOLD)
   IF PROFILE AVAILABLE
    CALCULATE MEAN SQUARE ERROR
    CONVERT TO PROBABILITIES, PS, Pd, PU (TABLE LOOK-UP)
    PS OUT = MAX (PS, PS OUT)
   END
  END
 END
END

WHERE
PS = PROBABILITY SAME
Pd = PROBABILITY DIFFERENT
PU = PROBABILITY UNCERTAIN

PROCESS FOR TRACKING VEHICLES

BACKGROUND OF THE INVENTION

1. Field of the Invention

The invention relates to the field of sensor resources management and tracking fusion and, in particular, to the tracking of vehicles who's identity becomes ambiguous.

2. Description of Related Art

Tracking moving ground targets by radar from an aircraft in a battlefield situation is a difficult process. First of all, there may be a large number of moving vehicles in the vicinity of the targets of interest. In addition, the terrain and foliage can intermittently block surveillance. Thus sensor management is critical. In most previous tracking instances, the tracker was data driven. Trackers were at the mercy of the data they ingested. The only way to improve performance was to fine tune prediction models, sensor models, and association algorithms. Such fine-tuning led to improved performance, but only marginally. Potentially, trackers could realize much more significant improvements if they could manage their input data stream.

Thus, it is a primary object of the invention to provide a process for improving the ability to track targets using sensor data.

It is another primary object of the invention to provide a process for eliminating ambiguities when tracking vehicles.

It is a further object of the invention to provide a process for eliminating ambiguities between targeted vehicles and other vehicles that come within close contact with the targeted vehicle.

SUMMARY OF THE INVENTION

Tracking vehicles on the ground by radar from an aircraft can be difficult. First of all, there may be a multiple number of vehicles in the immediate area, with several nominated for tracking. In addition, the vehicles may cross paths with other nominated or non-nominated vehicles, or become so close to each other that their identity for tracking purposes may be come ambiguous. Thus maximizing the performance of the radar systems becomes paramount. The radar systems, which are steered array type, can typically operate in three modes:

1. Moving target Indicator (MTI) mode. In this mode, the radar system can provide good kinematic tracking data.
2. High range resolution (HRR) mode. In this mode, the radar system is capable of providing target profiles.
3. High update rate (HUR) mode. In this mode, target is tracked at very high rate, such that the position is accurately determined.

Tracking performance is enhanced if the radar is operated in the mode best suited to type of information required.

An existing kinematic tracker is used to estimate the position of all the vehicles and their direction of travel and velocity. The subject process accepts the data from the kinematic tracker and maps them to fuzzy set conditions. Then, using a multitude of defined membership functions (MSFs) and fuzzy logic gates generates sensor mode control rules. It does this for every track and each sensor. The rule with the best score becomes a sensor cue.

In co-pending U.S. patent application Ser. No. 10/976,150 Process for Sensor Resource Management by N. Collins, et al. filed Sep. 28, 2004, a process is disclosed for tracking at least a first targeted moving vehicle from at least one second non-targeted vehicle by means of a radar system within an aircraft, the radar having moving target indicator, high range resolution and high update rate modes of operation, the process comprising the steps:

1. Tracking the kinematic quality of the vehicles by calculating position, heading, and speed uncertainty of the vehicles and providing a first set of scores therefore;
2. Collecting data needed for future required disambiguations by calculating the usefulness and neediness of identification measurements of all tracked vehicles and providing a second set of scores therefore;
3. Collecting required data needed for immediate disambiguation by calculating the usefulness and neediness of identification measurements of all ambiguous tracked vehicles and providing a third set of scores therefore.
4. Selecting the highest over all score of from said first, second and third scores; and Cueing the radar to track the vehicle with the highest over all score to operate in the high update rate mode or, high range resolution mode, or moving target indictor mode depending upon which score is the highest score.

The problem of vehicles crossing one another, or coming into close contact is what creates an ambiguity. Thus the subject invention makes use of a feature aided track stitcher (FATS). This system continuously monitors nominated vehicles and records their radar signature as a function of its angular relationship to the aircraft and stores this information in a database. Thus should two vehicles come so close together that an ambiguity is created and then separate, the FATS is used to compare the radar signature of the vehicles after separation with those in the database. If the nominated vehicle assumes an angular relationship to the vehicle that is similar to one in the database for that nominated vehicle, then the ambiguity may be removed.

If there are two aircraft monitoring the area, then the second aircraft will take the second highest score with the limitation that the radar operates in a different mode to eliminate interference between the radar systems.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 3 is a depiction of the types of positional, direction and velocity data provided by a typical kinematic tracker.

FIG. 4 is a chart of the Sensor mode options versus actions to be monitored and track status.

FIG. 22 is a flow diagram for rule numbers five M25.

FIG. 27 is a flow diagram for rule numbers eight M28.

FIG. 28 is a flow diagram for rule numbers nine M29.

FIG. 29 is a flow diagram for rule numbers ten M30.

FIG. 38 is second test case of the intersection scenario.

FIG. 39 is third test case of the intersection scenario.

FIG. 40 is fourth test case of the intersection scenario.

FIG. 41 is a table summarizing the results of the test cases illustrated in FIGS. 37, 38, 39, and 40.

FIG. 42 is a disambiguate logic chart for the FATS.

FIG. 43 is a Probability of feature match logic for the FATS.

DESCRIPTION OF THE PREFERRED EMBODIMENT

Figure 1:
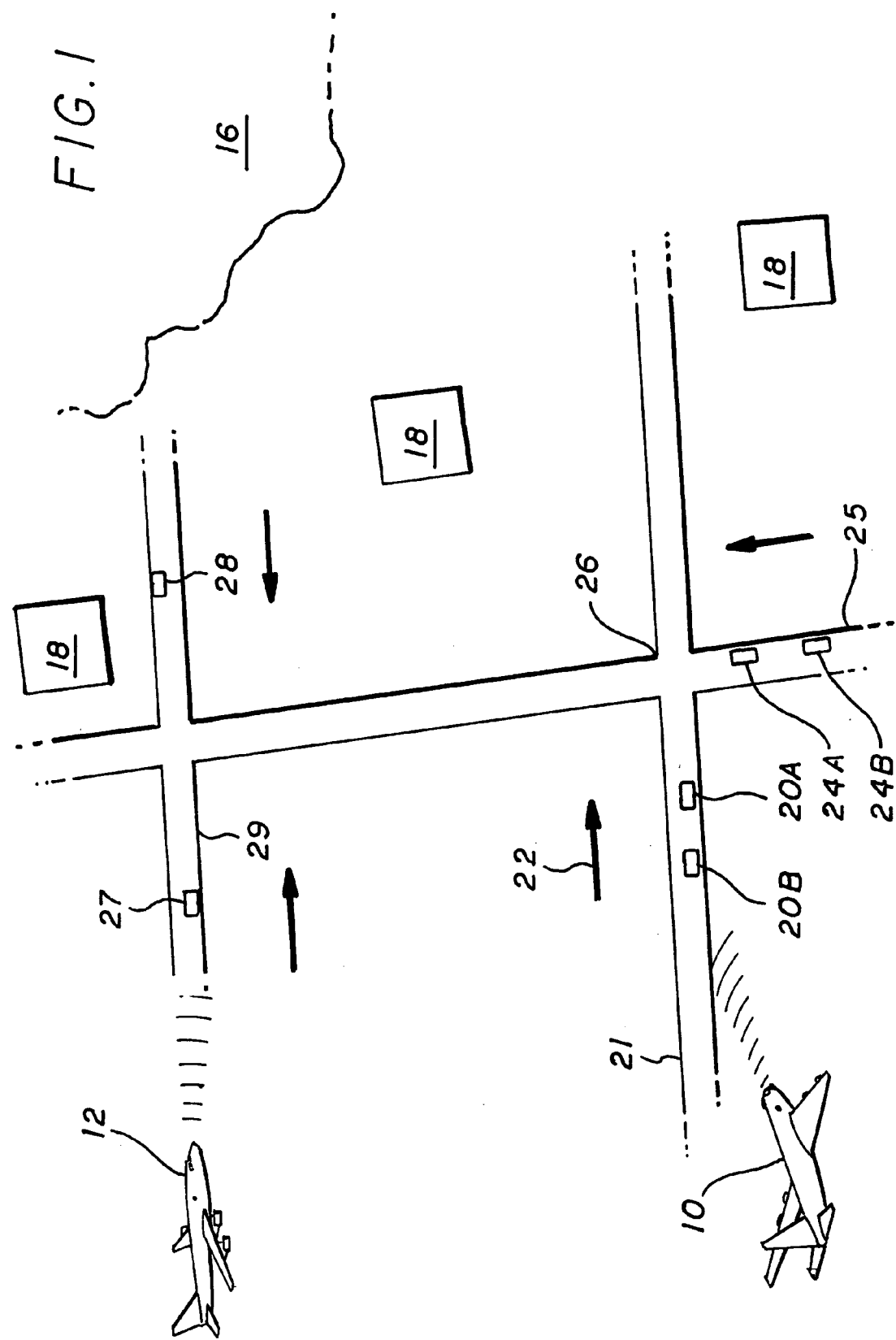
FIG. 1 is a simplified view of terrain being monitored by two aircraft.

Referring to FIG. 1, which is a simplified view of terrain wherein several vehicles are traveling and are being monitored by aircraft 10 and 12. Because the vehicle position as well as its velocity and direction of travel are estimates, they are generally defined as "tracks", thus vehicle and track are used interchangeably hereinafter. The terrain includes hills 16, with several structures 18 nearby. Vehicles 20A, and 20B are traveling on road 21 in the direction indicated by arrow 22 toward the hills 16. Vehicles 24A, and 24B are traveling on road 25, which intersects road 21 at point 26, while vehicle 27 and 28 are traveling toward each other on road 29 some distance away. The situation illustrated in FIG. 1 is for purposes of illustration, for any real situation in the battlefield will be far more complex. Furthermore, while two aircraft are shown, there may be only one or more than two aircraft involved in the tracking. In addition, while aircraft are used, the system could be ground based or on ships. Thus the use of aircraft is for purposes of illustration only.

Figure 2:
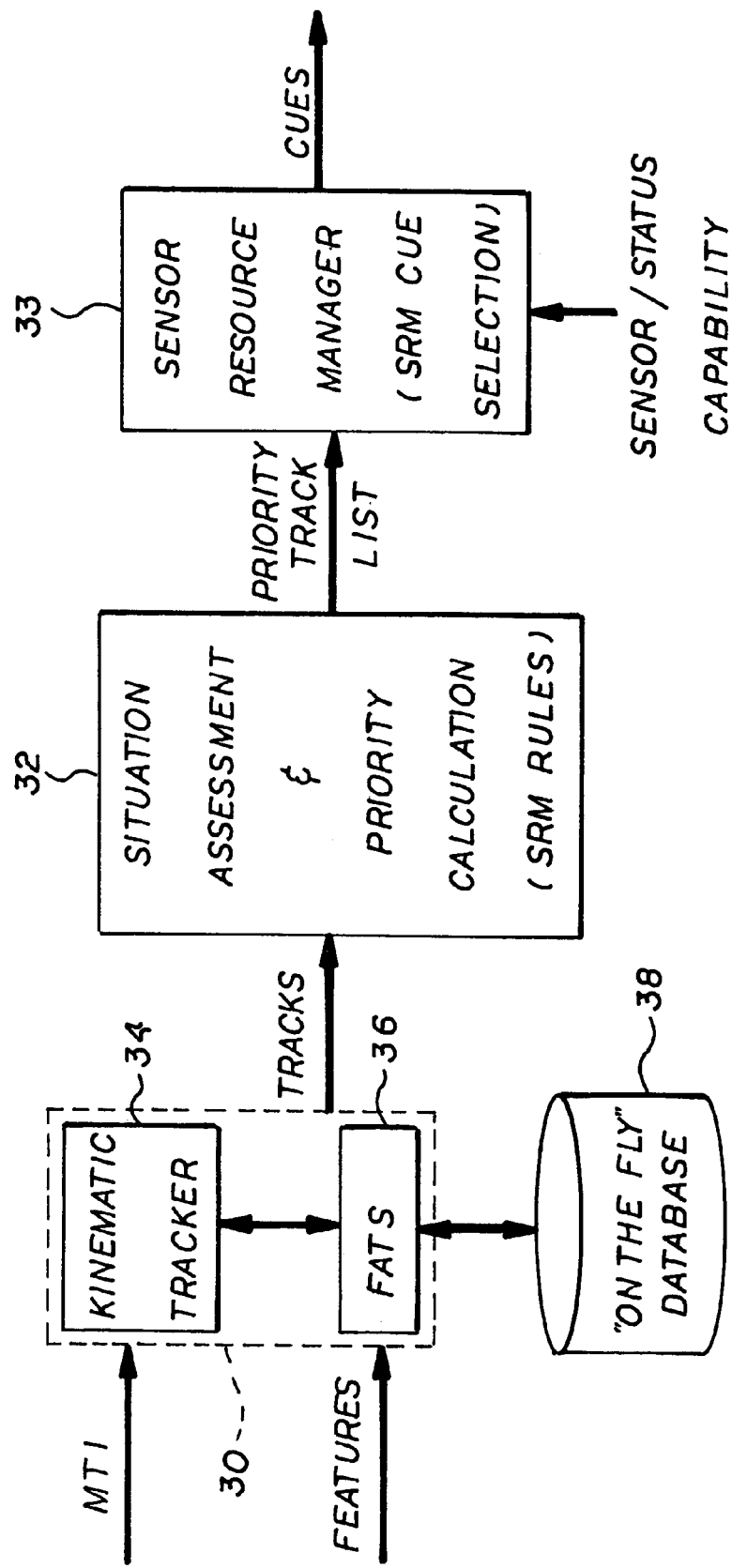
FIG. 2 is a long-term track maintenance architecture map for data fusion design.

The long-term track maintenance architecture map for the sensor management system design is illustrated in FIG. 2. There are three stages: target tracking 30, situation assessment and priority calculation 32, and sensor resource management (SRM) 33. Target tracking 30 involves the use of a Kinematic Tracker program 34, which receives input from the sensor in the moving target Indicator (MTI) mode. Kinematic tracking programs are available from such Companies as Orincon Corporation, San Diego, Calif. and Northrop Grumman Corporation, Melbourne, Fla. Tracking a vehicle that is isolated from other vehicles is easy; however, when the vehicles are in close proximity and traveling at the same or nearly the same speed, it becomes difficult (see FIG. 1). Thus the second level is the use of a Feature Aided Tracking Stitcher (FATS) system 36 to refine the data provided by the kinematic tracking program 34.

The data from the FATS 36 is stored in an on-the-fly database 38. The output from the Kinematic tracker 34 is provided to the SRM 33, which is a process that provides the analysis of tracking information from radar systems and makes the decision as to which of three radar modes (herein after referred to as Sensor Modes) is necessary to ensure that the vehicle remains tracked. Note that the sensors by use of the Kinematic tracker 34 and FATS 36 can determine the radar cross-section (RCS), speed, direction of travel and distance to the vehicle as well as the distance between vehicles. FIG. 3 presents a summary of the data provided by the Kinematic tracking program 34.

The three modes of the radar system are:

1. Moving target Indicator (MTI) mode. In this mode, the radar system can provide good kinematic tracking data.
2. High range resolution (HRR) mode. In this mode, the radar system is capable of providing target profiles.
3. High update rate (HUR) mode. In this mode, the target is tracked at very high rate, such that the position is accurately determined.

Tracking performance is enhanced if the radar is operated in the mode best suited to the type of information required. FIG. 4 is chart of Sensor modes versus to be monitored and track status. The SRM uses a two-stage process to aggregate hundreds of variables and constraints into two sensor cue decisions. First, it accepts input data from the sensors and maps this to fuzzy set conditions. The system uses thirty-seven defined membership functions (MSF). A membership function is a fuzzy set concept for assigning a quantitative score to a characteristic. The score is determined by the degree to which that characteristic is met. The membership functions are as follows:

MSF1 Closeness To Nominated Track (M1 Closeness)—How far away is a track that may be confused with the nominated track.

MSF2 Same Heading As Nominated Track (M2 Same Heading)—If the confuser track is heading in the same direction as the nominated track.

MSF3 Similar Speed As Nominated Track (M3 Similar Speed)—How close is the speed of a confuser track to the nominated track.

MSF4 Small Time-To-Go To Common Intersection Of Nominated Track (M4 Small TTG To Common Intersection)—Is the time that a confuser track is from an intersection to which a nominated track is heading small.

MSF5 Similar Time-To-Go to Common Intersection As Nominated Track (M5 Similar TTG to Common Intersection)—Confuser Track has about the same time-to-go to the same intersection as the nominated track is heading towards.

MSF6 Passing Scenario Confuser Track to Nominated Track (M6 Passing Scenario)—It is the minimum of MSF 1, 2, and 3.

MSF7 Common Intersection Factor To Nominated Track (M7 Intersection Scenario)—It is the maximum of MSF 4 and 5.

MSF8 Confuser Factor (M8 Confuser Status)—It is the maximum of MSF 6 and 7.

MSF9 Nominated Status (M9 Nomination Status)—The track is nominated by the operator or is ambiguous with a nominated track.

MSF10 Uniqueness Of Available Aspect of Vehicle to fill hole (M10 Unique Aspect)—Has the FATS system provided a new aspect of the vehicle at an angle not already in the data base.

MSF11 Holes In "On-The-Fly" database (M11 Holes In db)—Does this track have big gaps of missing aspect angle coverage in the "on-the-fly" database.

MSF12 Helpfulness of Aspect Angle to Disambiguate (M12 Helpful Aspect)—Will a profile at this predicted aspect angle help to disambiguate the track. Are there similar aspects already in the "on-the-fly" database.

MSF13 Poor Kinematic Quality (M13 Poor Kin. Qual.)—Minimum of MSF 18, 19, and 20

MSF14 Track Not Screened (M14)—Is track screened by terrain or trees, etc.

MSF15 Track is not kinematically ambiguous (M15 Not Kin Ambig.)—Is track not close to other tracks.

MSF16 Track Not in Limbo (M16 Not Limbo)—Is track identified by FATS as ambiguous (0 or 1).

MSF17 Track in Limbo (M17 Limbo or ambiguous) Track marked by FATS as ambiguous (0 or 1).

MSF18 Time Since Last Measurement (M18 Long Time Since Last Measurement) How long has track gone without an updating measurement.

MSF19 Position Uncertainty Big (M19 Position Uncertainty)—Does the track's covariance matrix reflect that the track's position estimate is of a low quality.

MSF 20 Heading Uncertainty Big (M20 Heading Uncertainty)—Does the track's covariance matrix reflect that the track's heading estimate is of a low quality.

MSF21 is the score for Rule.
MSF22 is the score for Rule 2.
MSF23 is the score for Rule 3.
MSF24 is the score for Rule 4.
MSF25 is the score for Rule 5.
MSF26 is the score for Rule 6.
MSF27 is the score for Rule 7.
MSF28 is the score for Rule 8.
MSF29 is the score for Rule 9.
MSF30 is the score for Rule 10.

MSF31 Helpful Multi-Lateral Angle (M31 Good Multi-Lat Angle)—Is the current line-of-sight angle from the sensor to the track a good angle to reduce position error covariance? MSF32 Not A Bad Pose or Low Minimum Detectable Velocity (M32 Not Bad Pose)—Is the current aspect angle to the track not a good pose for use of Profiles (Side poses do not work as well)

MSF33 In Field Of View (M33FOV)—Is track in field of view of sensor.

MSF34 Small Distance Of Closest Separation (M34 Small Distance Of Closest Separation)—Will this confuser track be close to the nominated track at the predicted closest point of spearation.

MSF35 Small Time-To-Go To Closest Separation (M35 Small TTG to closest separation)—Is the time-to-go until the predicted point of closest separation small?

MSF36 Off-Road Scenario (M36 Off-Road Scenario)—Minimum of M34 and M35.

MSF37 Good Sigma Range Rate Estimate (M37 Good $\sigma_r$)—Does the current track's covariance matrix reflect that the track has a good quality range rate estimate?.

MSF38 Clearness Of Track M38 Clearness)—How far away is track from other tracks.

Figure 5A:
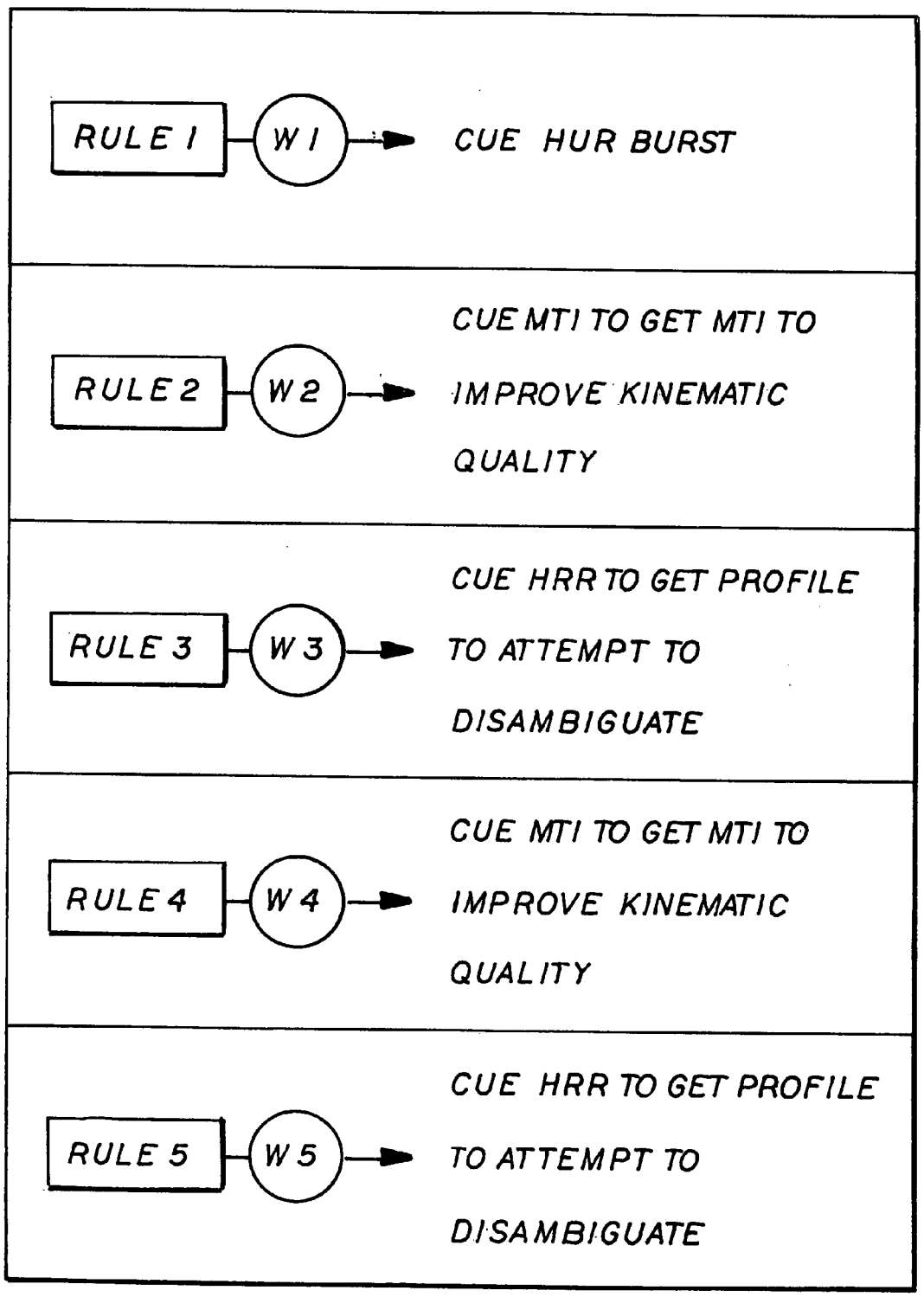
FIGS. 5A and 5B are a simplified process flow chart for calculation scores for radar mode selection.
Figure 5B:
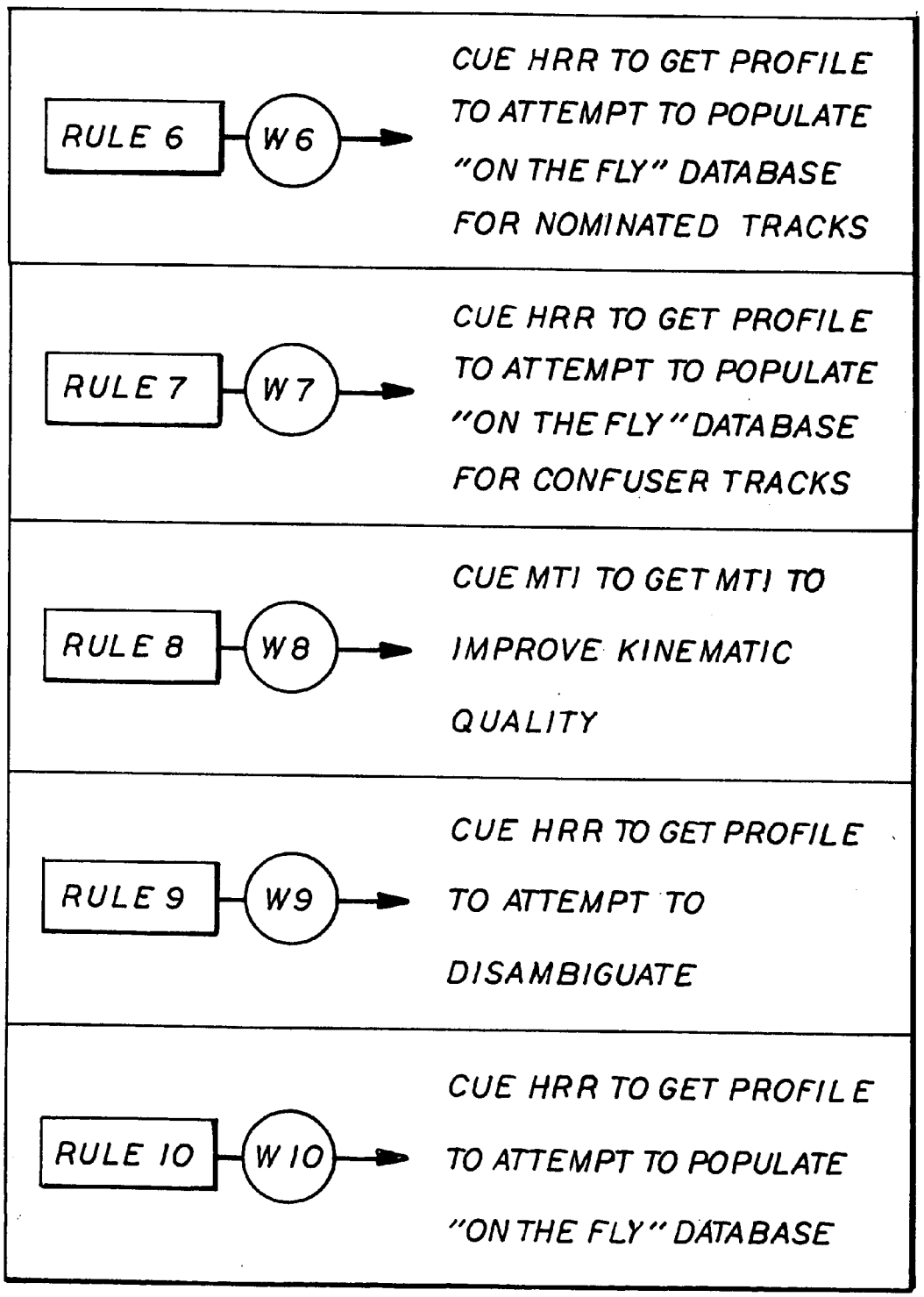

Fuzzy logic gates are used to generate ten sensor mode control rules, shown in FIGS. 5A and 5B, which are multiplied by weighing factors (to be subsequently discussed) to determine a rule score. It does this for every track and each sensor. The rule with the best score becomes a sensor cue. The second sensor cue, if there is a second sensor, is the next best score. In this way, the fuzzy network decides which of three modes to request and where to point each sensor. Again note that while two sensors will be discussed, a single sensor or more than two could be used.

Figure 6:
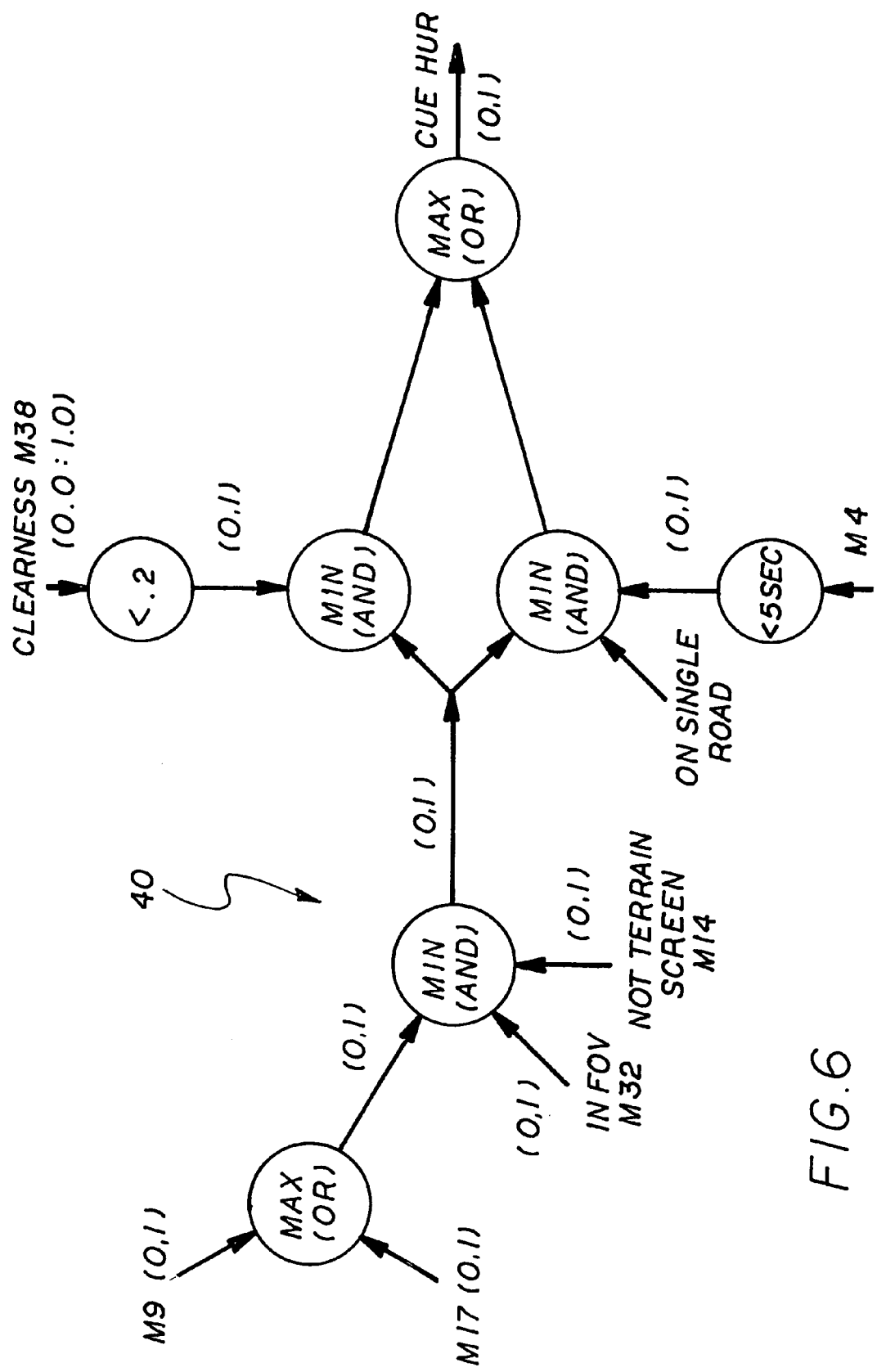
FIG. 6 is a flow diagram for rule number one.

Referring to FIGS. 3–5 and additionally to FIG. 6, rule number 1 (indicated by numeral 40), is illustrated in detail. Rule number 1 is the only hard or non-fuzzy logic rule. Rule 1 provides a HUR Burst data when a key track (nominated) is near an intersection or near other vehicles. This is to maintain track continuity when a nominated track is predicted to be taking a maneuver or predicted to be close to other tracks (confusers).

1. It is first necessary to determine the nomination status of the track (M9). Nomination status is assigned a one if it is a nominated track OR track is ambiguous with a nominated track (determined by either the kinematic tracker 34 or "FATS" system 36 to be subsequently discussed) AND is kinematically ambiguous (M1) AND
2. Track is in field of view (M32) AND not terrain screened (M14) AND not near an intersection (M4).

The resulting score is multiplied by weighing factor W1 to provide the rule number one score.

The track is nominated (M9) by the operator as one of importance and Kinematically ambiguous (M17) status is determined by the kinematic tracker 34 or FATS 36, to be subsequently discussed. The calculation of the clearness M38 score is as follows:

Given:

From the kinematic Tracker
Xt1=Track one X position in meters (eastward)
Yt1=Track one Y position in meters (northward)
Yt1=Track two X position in meters (eastward)
Xt2=Track two Y position in meters (northward)

From the aircrafts navigation system
XP=Sensor aircraft X position in meters (eastward)
YP=Sensor aircraft Y position in meters (northward)

Then:
D=Distance Track 1 to Track 2

$$D = \sqrt{((Xt1-Xt2)^2 + (Yt1-Yt2)^2)}$$

R1=Range of sensor aircraft to Track 1

$$R1 = \sqrt{((XP-Xt1)^2 + (YP-Yt1)^2)}$$

R2=Range of sensor aircraft to track 2

$$R2 = \sqrt{((XP-Xt2)^2 + (YP-Yt2)^2)}$$

$\Delta R$=Approximate down range difference between tracks $$\Delta R = R1 - R2$$

$\Delta XR$=Approximate cross range difference between tracks $$\Delta XR = \sqrt{D^2 - \Delta R^2}$$

If $\Delta R > D_1$ or $\Delta XR > D_2$, Score=1
If not, $$\text{Score} = \frac{(\Delta R - D_1) * (\Delta XR - D_2)}{D_1 * D_2}$$

Where $D_1$=Minimum distance threshold, $D_2$=maximum distance threshold. The clearness score typically must be greater than 0.2 for the sensors presently being used; they may vary from sensor to sensor.

Figure 7:
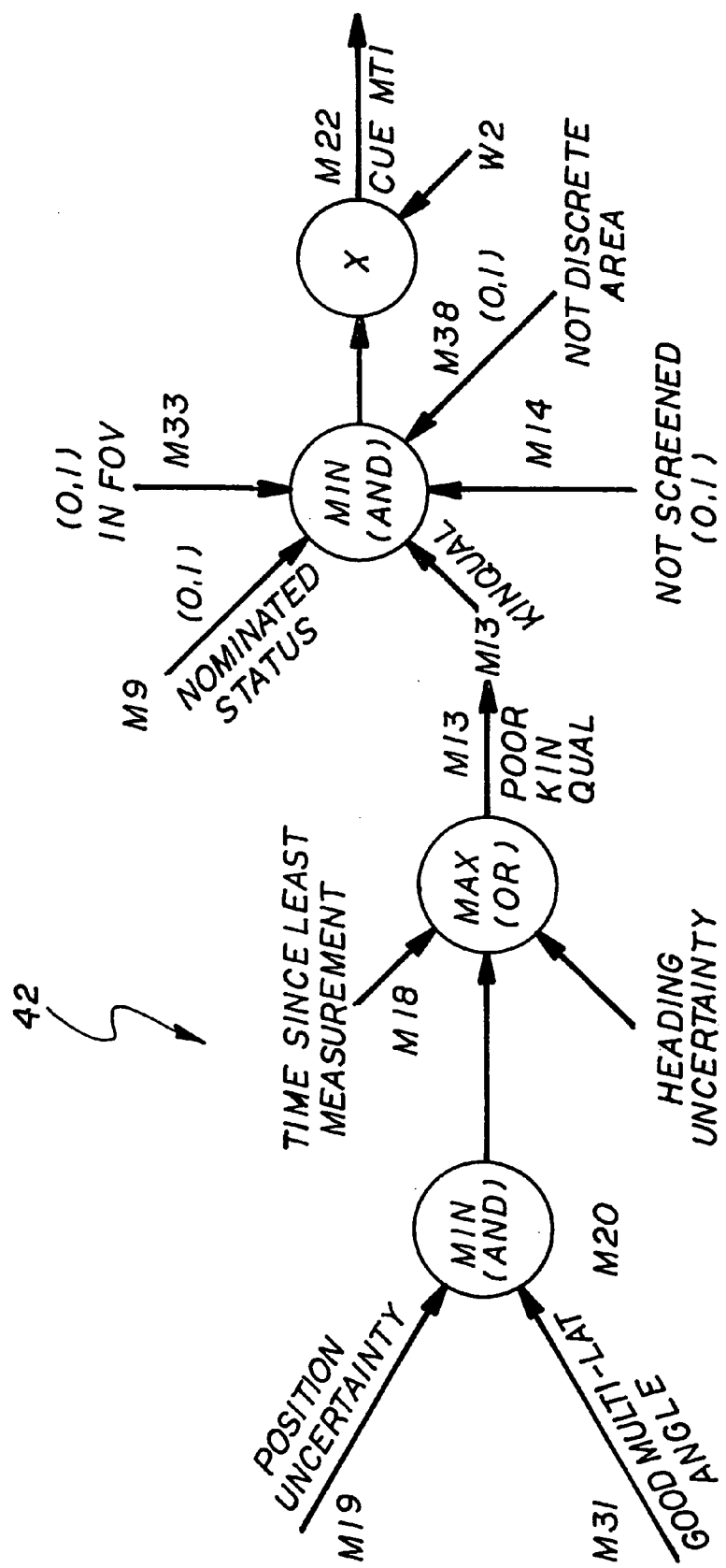
FIG. 7 is a flow diagram for rule numbers two.

As to the Time-To-go to the nearest intersection (M4), the vehicle speed and position are known, as well as the distance to the nearest intersection. Thus the time can be easily computed. For the sensors presently used, the time must be less than five seconds Still referring to FIGS. 3–5 and additionally to FIG. 7, the second rule, designated by numeral 42, provides standard MTI data for nominated track who currently have marginal kinematic estimation accuracy for estimation improvement and includes the following steps:
1. If nominated track (M9) OR track ambiguous with nominated track (M 9) AND poor kinematic quality (M13), which comprises time since last measurement is long (M18), or position uncertainty (M19), AND helpful multi-lateral angle (M31) OR heading uncertain (M20). AND
2. Track is not terrain screened AND track is in FOV (M33) AND not in discrete area (M 38).

The result of Rule 2 is multiplied by weighting factor W2, which provides Rule 2 score (M22).

The Membership function M13 poor kinematic quality is a function of M19 position uncertainty, M 31 Good Multi-lateral angle, M18 Time since last measurement and M20 heading uncertainty.

Following are the calculations for M18 Long time since last measurement M18.

Given $\Delta T$=average sensor revisit rate.

$$T_1 \cong 2\Delta T$$

$$T_2 \cong 10\Delta T$$

TLM=Time since last measurement.

If TLM$\leq T_1$ Then Score=0

If TLM$\geq T_2$ Then Score=1

If $T_1$<TLM<$T_2$ Then:

$$\text{Score} = \left(\frac{TLM - T_1}{T_2 - T_1}\right)^2$$

Figure 8:
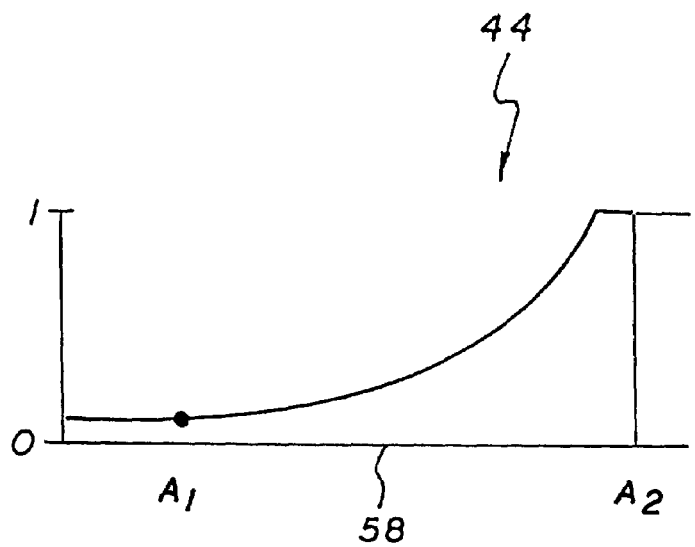
FIG. 8 is a graph illustrating a portion of the formulas for determining the score of the long time since last measurement function M18.

See FIG. 8 for graph 44.

The heading uncertainty function (M20) is calculated using the following formula. The heading $\sigma_h$ is first calculated using location values from the kinematic tracker.

$$\sigma_H \cong \left(\frac{Y * P_{XX} - 2 * X * Y * P_{XX} + X * P_{YY}}{X^2 + Y^2}\right) * \frac{180}{\pi}$$

Then if:

$\sigma_H < A_1$, Then Score=0

$\sigma_H > A_2$, Then Score=1

$A_1 < \sigma_H > A_2$, Then:

$$\text{Score} = \frac{\sigma_H - A_1}{A_2 - A_1},$$

Figure 9:
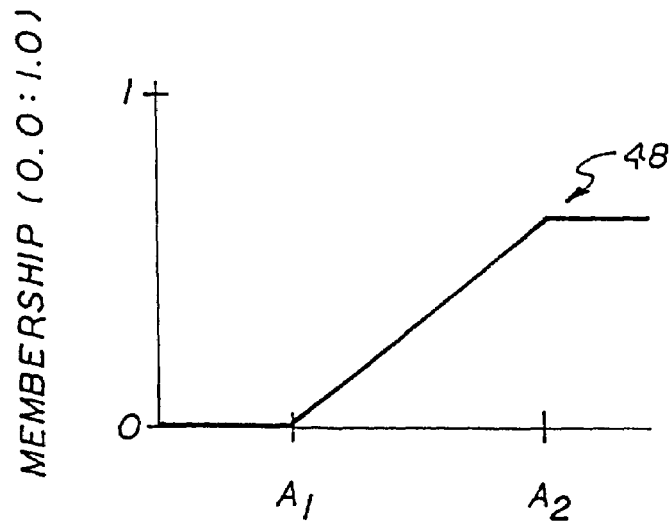
FIG. 9 is a graph illustrating a portion of the formulas for determining the score of the heading uncertainty big membership function M20

See graph 48 in FIG. 9.

The value of $A_1$ and $A_2$ of course will depend upon the sensor system. Note that uncertainty varies as the square of the time elapsed from the last measurement because of the possibility of acceleration of he vehicle.

Figure 10A:
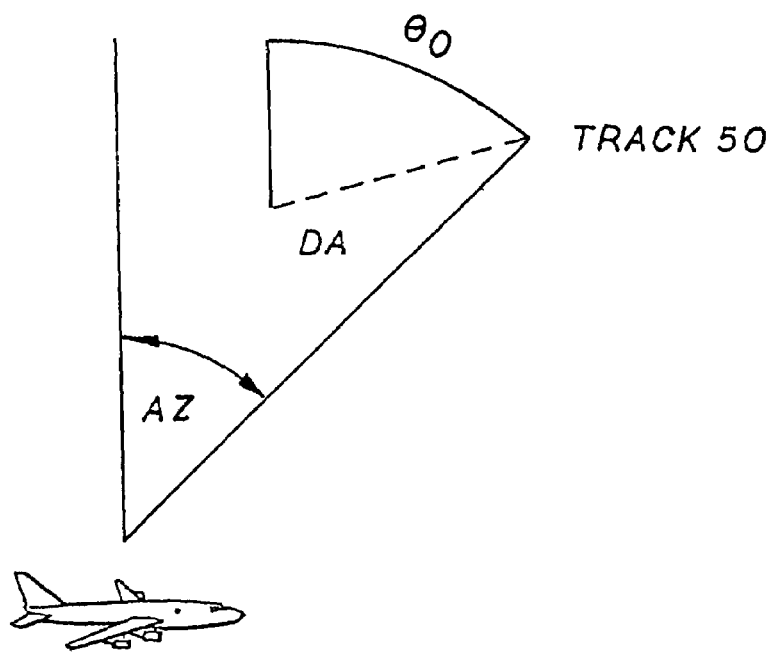
FIG. 10A is a graph illustrating the measurement of the good multi-lateration angle membership function M31.

The formula for determining the good multi-lateral angle M31 is provided in FIG. 10B and is discussed below. The first calculations require the determination of the angular relationships between the aircraft 10 and track 50 indicated (FIG. 10A). The Xt, Xp, Yt, Pxy, Pyy and Pxx values are all obtained from the kinematic tracker system 34 (FIG.

$$4AZ = \text{Tan}^{-1}\left(\frac{X_T - X_P}{Y_T - Y_P}\right)$$

$$\theta_O = \frac{\text{Tan}^{-1}\left(\frac{2P_{XY}}{P_{YY} - P_{XX}}\right)}{2}$$

-continued $$DA = |AZ - \theta_O|$$

$$Score = \frac{DA*(A_1 - 1.0)}{90} + 1.0$$

Figure 10B:
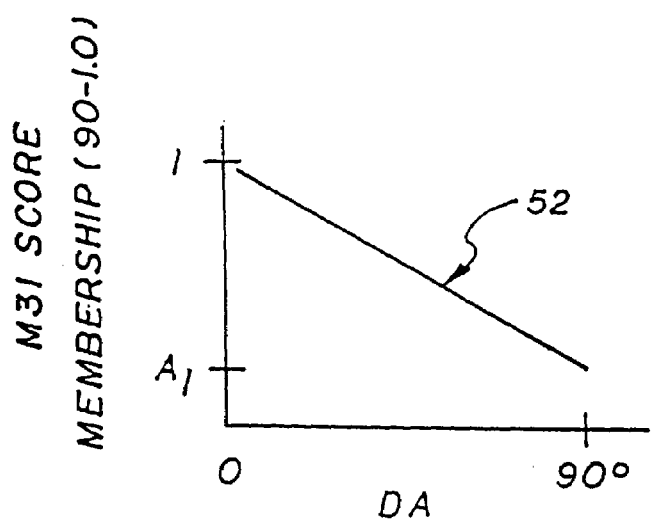
FIG. 10B is a graph illustrating a portion of the formulas for determining the score of the good multi-lateration angle membership function M31.

See graph 52 in FIG. 10B.

Where $A_1$=An initial setting depending upon system sensors.

Figure 11A:
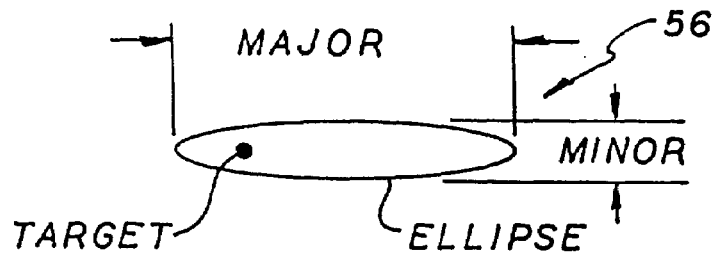
FIG. 11A is a diagram of the ellipse used in the position uncertainty membership function M19.

The Position uncertainty (M19) is determined by calculating the area of an ellipse 56, as illustrated in FIG. 11A, in which it is estimated that the vehicle being tracked resides.

$$\text{Major axis} = \sqrt{P_{XY} + P_{XX} \frac{+\sqrt{P_{YY}^2 + P_{XX}^2 + 4P_{XY}^2 - 2P_{XX}*P_{YY}}}{2}}$$

$$\text{Minor axis} = \sqrt{P_{YY} + P_{XX} \frac{-\sqrt{P_{YY}^2 + P_{XX}^2 + 4P_{XY}^2 - 2P_{XX}*P_{YY}}}{2}}$$

Pxx, Pyy, Pxx$^2$, Pxy$^2$, Pyy$^2$ are measurements provided by the kinematic tracker system 34 (FIG. 2).

Area=π*major axis*minor axis

If area<$A_1$, Then score=0

If area>$A_2$, Then score=1

Figure 11B:
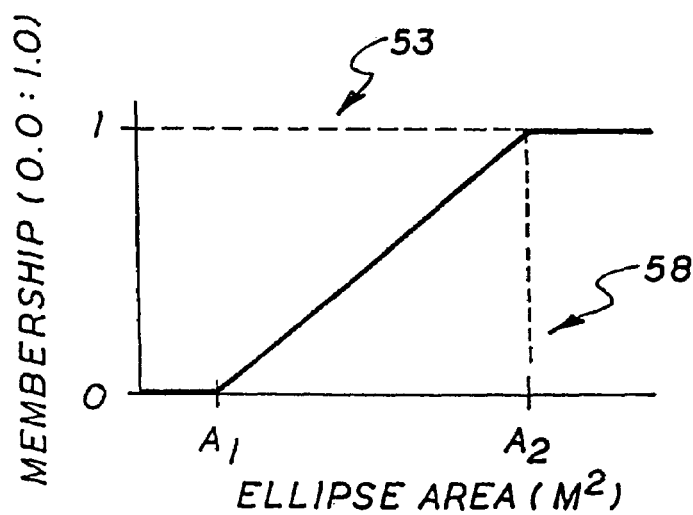
FIG. 11B is a graph illustrating a portion of the formulas for determining the score of the position uncertainty function uncertainty membership function M19.

In between $A_1$ and $A_2$, then:

$$Score = \frac{Area - A_1}{A_2 - A_1},$$

see graph 53 in FIG. 11B

The value of $A_1$ and $A_2$ are determined by the capability of the sensor system.

Figure 12:
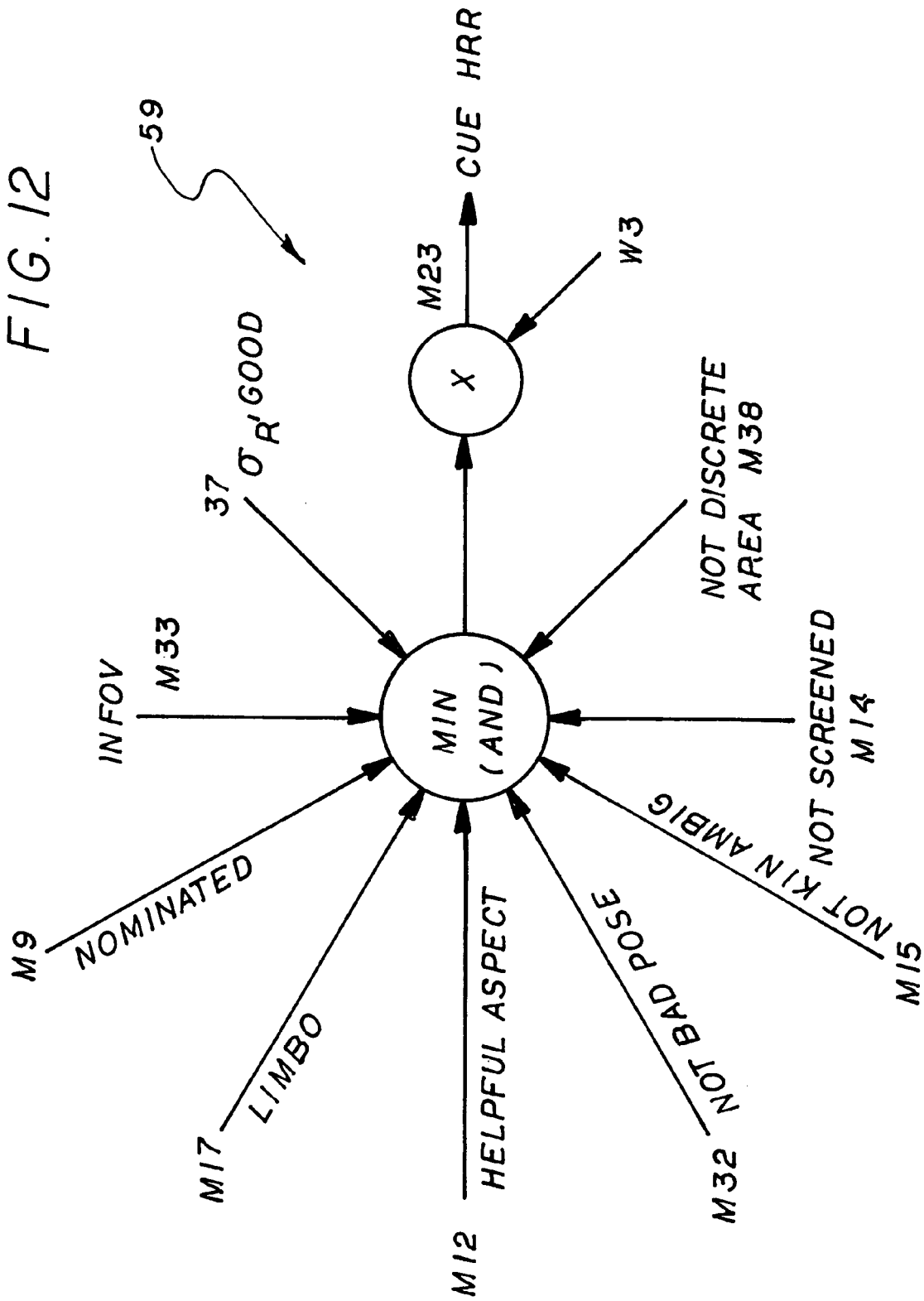
FIG. 12 is a flow diagram for rule number three.

Still referring to FIGS. 4–6, and additionally to FIG. 12, rule 3, and indicated by numeral 59, requests HRR on nominated tracks to get profiles to try to disambiguate tracks that are now in the open but in the past where ambiguous with other tracks. Rule 3 is follows:
1. If nominated track (M9) OR track ambiguous with nominated track is in limbo (M17) AND
2. A helpful aspect is available (M12) and not bad side pose (M32) and not in discrete area (M38) AND
3. Track is not kinematically ambiguous (M15) AND
4. Track has good sigma range rate (M37).

The result is multiplied by Weighting factor W3 to provide Rule 3 score (M23).

Figure 13:
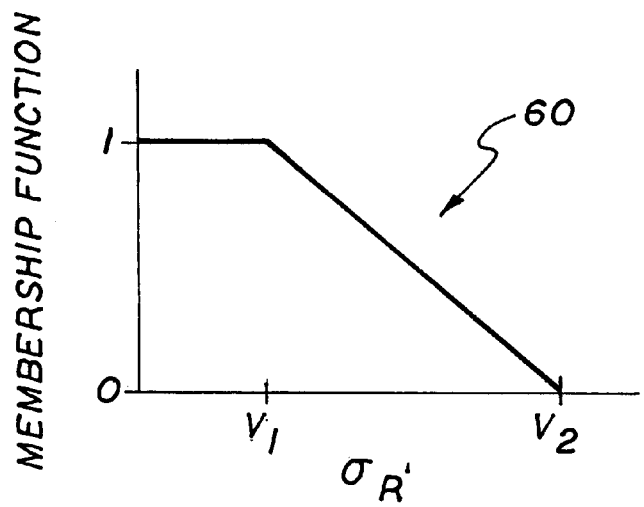
FIG. 13 is a graph illustrating a portion of the formulas for the good track $\sigma_r$ (sigma r) membership function M37.

Referring to FIG. 13, The good track $\sigma_{R'}$, standard deviation of range rate (M37) is easily determined by the kinematic tracker program 34.

First calculate relative north and east from aircraft:
$Y_T$=North Position of Track.
$Y_P$=North Position of Aircraft.
$X_T$=East Position of Track.
$X_P$=East Position of Track.

$$N=Y_T-Y_P$$

$$E=X_T-X_P$$

$$N'=Y_T'-Y_P'$$

$$E'=X_T'-X_P'$$

Then calculate horizontal range R:

$$R=\sqrt{N^2-E^2}$$

Calculate H transformation:

$$H11 = \frac{E*(N'*E - N*E')}{R^3}$$

$$H12 = \frac{N}{R}$$

$$H14 = \frac{N*(N*E' - N'*E)}{R^3}$$

$$H15 = \frac{E}{R}$$

Where D=Target speed.

Thus:

$$\sigma_R' = \sqrt{\begin{array}{l} H11^2*P_{YY} + 2*H11*H12*P_{YY'} + 2*H11*H14*P_{YX} + \\ 2*H11*H15*P_{YX'} + H12*P_{YY'} + 2*H12*H14*P_{Y'X} + \\ 2*H12*H15*P_{Y'X'} + H14^2*P_{XX} + 2*H14*H15*P_{XX'} + \\ H15^2*P_{X'X'} \end{array}}$$

Knowing $\sigma_{R'}$

If $\sigma_{R'}<V_1$, Then Score=1

If $\sigma_{R'}>V_2$, then Score=0

If $V_1<\sigma_{R'}<V_2$, Then:

$$Score = \frac{V_1 - \sigma_{r'}}{V_2 - V_1} + 1$$

and as illustrated in the graph 60 in FIG. 13.

Where the value of $V_1$ is the minimum valve and $V_2$ is the maximum value in meters per second.

Figure 14A:
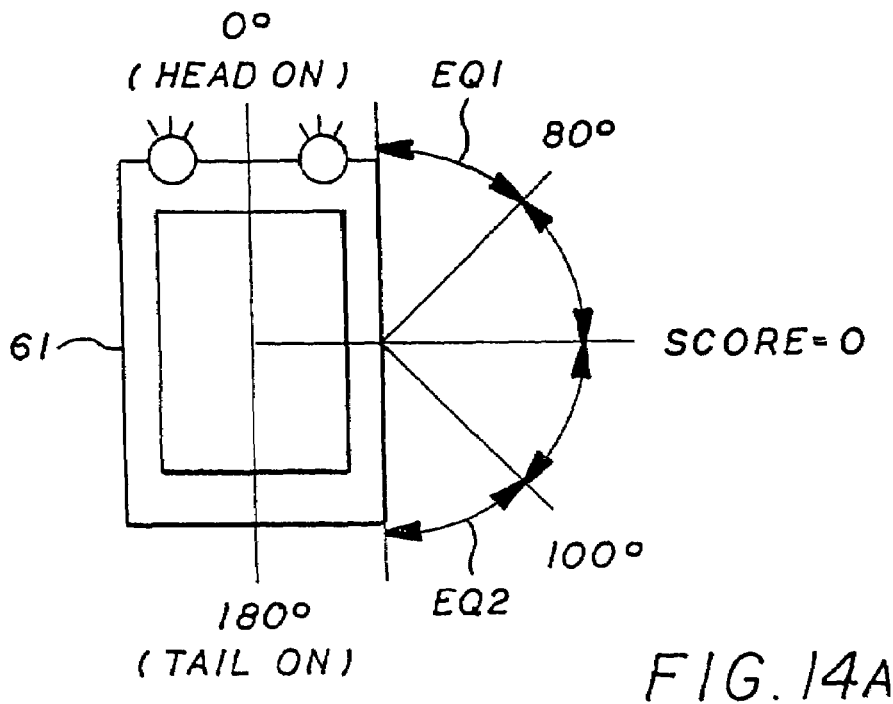
FIG. 14A is a top view of a vehicle with aspect angles indicated.
Figure 14B:
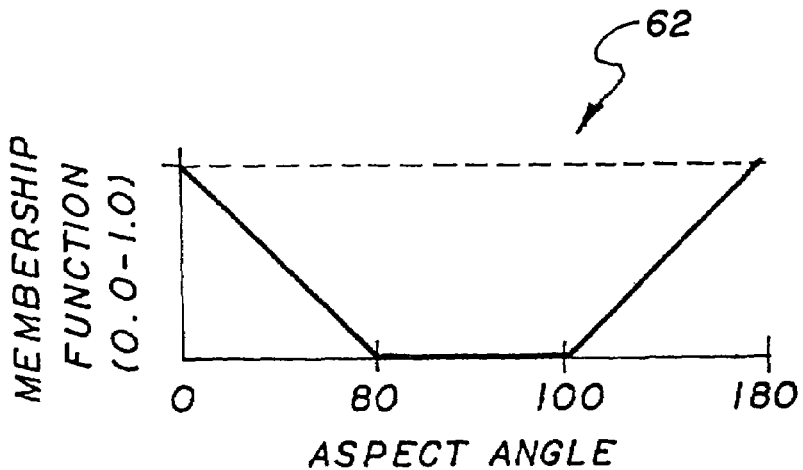
FIG. 14B is a graph illustrating a portion of the formulas for the not bad side pose membership function M32.

Referring to FIGS. 14A and 14B, it can be seen that the not bad side pose (M32) is also easily calculated and depends on the viewing angle of he vehicle shown in FIG. 14A.

If 80°<Aspect angle<100°, Score=0

If Aspect angle<80°, Then:

$$Score = 1 - \frac{Aspect.Angle}{80}$$

If Aspect angle>100°, Then:

$$\text{Score} = \frac{\text{Aspect.Angle} - 100°}{80}$$

A graph 62 in FIG. 14B plots these relationships.

The availability of a helpful Aspect function (M12) is also easily determined using the following equations:

Given |Δ Heading|=Absolute value of difference in heading between two vehicles.

If |Δ Heading|>$A_2$, Then Score=0

If $A_1$<|Δ Heading|<$A_2$, Then:

$$\text{Score} = \frac{A_1 - |\Delta\text{Heading}|}{A_2 - A_1} + 1,$$

Figure 15:
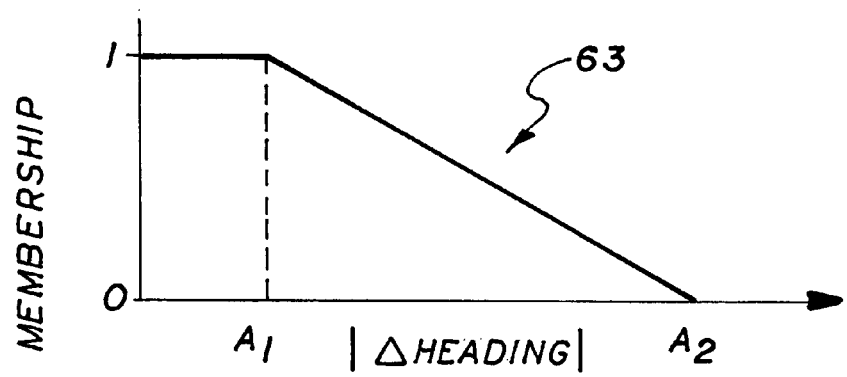
FIG. 15 a graph illustrating a portion of the formulas for the availability of helpful aspect M12.

As illustrated in the graph 62 in FIG. 15.

If |Δ Heading|<$A_1$ Then score=1

In order to disambiguate using profile matching, the profiles matched must be at nearly the same aspect angle. The helpful aspect membership functions quantifies the fuzzy membership (0.0 to 1.0) of the "helpfulness" of a collected new profile based upon how far away it is from the existing profiles in the Track's 'on-the-fly' profile database. If the collection aspect angle is close to the closest stored profile, it will be completely helpful, (Score=1.0). If the aspect angle is different, say over over 15 degrees away from the nearest stored profile, it will be completely useless (score=zero). In between, the usefulness will vary.

Figure 16:
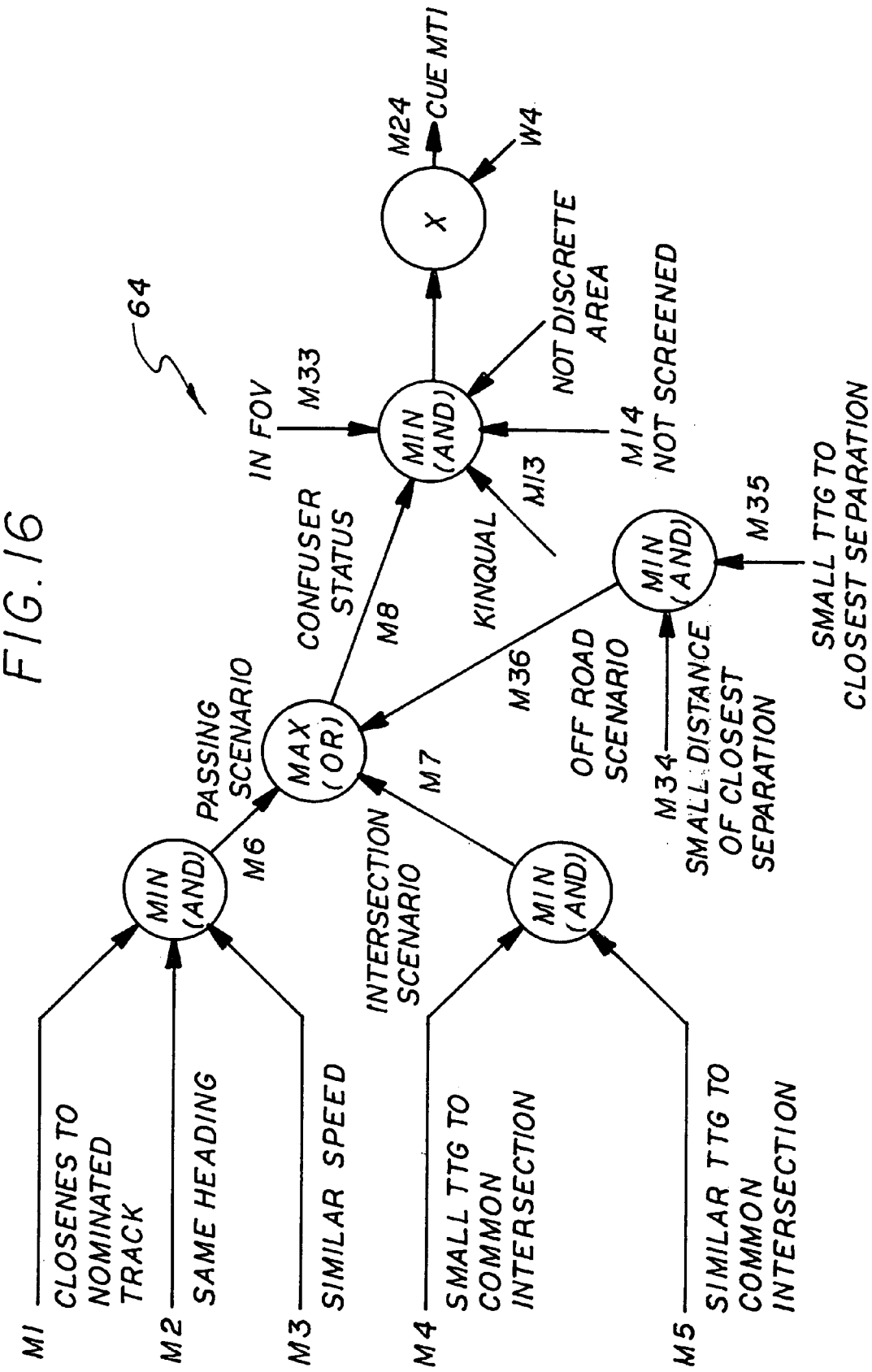
FIG. 16 is a flow diagram for rule number four M24.

Referring to FIG. 16, rule 4, indicated by numeral 64, provides standard MTI data for tracks deemed to be potential confuser tracks with a nominated track, which currently have marginal kinematic estimation accuracy for estimation improvement. Rule 4 is as follows:
1. If a track is a confuser status (M8) to a (nominated track OR track is ambiguous with nominated track) AND
2. Has poor kinematic quality (M13) AND track is not terrain screened (M38) AND track is in field of view (M33) AND not in discrete area, The resulting score multiplied by W4 provides the rule 4 score M24.

M8 confuser status is determined by:
1. If a track (is close to nominated track (M1) AND at the same heading (M2) AND at a similar Speed (M3)), which is the passing scenario (M6) OR
2. Has a small time-to-go to a common intersection with a nominated track (M4) AND a similar time-to-go to a common intersection (M5) OR
3. Has a small-predicted distance of closest separation to a nominated track M34) AND a small Time-to-Go to predicted time of closest separation M35.

The closeness to nominated track membership function M1 is also easily determined.

If no nominated track, Then Score=0

If D>$D_2$, Then Score=0

If D<$D_1$, Then Score=1

If $D_1$<D<$D_2$, Then:

$$\text{Score} = \frac{D_1 - D}{D_2 - D_1} + 1$$

Figure 17:
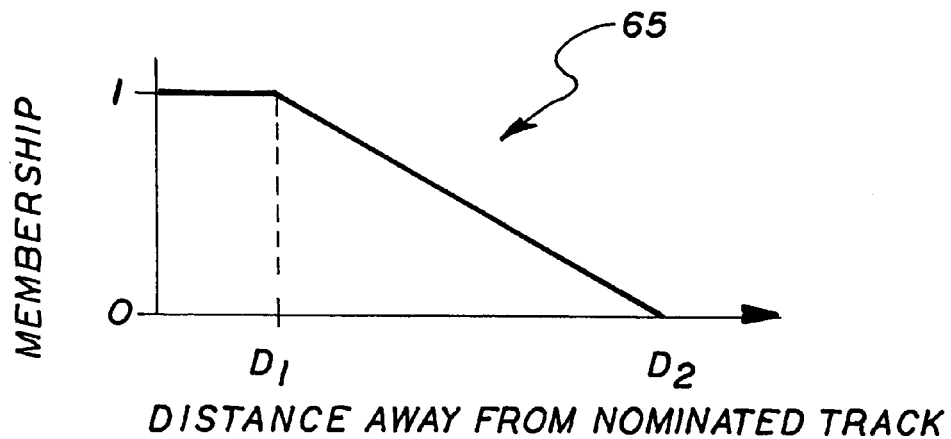
FIG. 17 is a graph of a portion of the formula for the derivation of the closeness to nominated track membership function M1.

See graph 65 in FIG. 17.

Where:

$D_1$ is the minimum distance threshold and $D_2$ is the maximum distance threashold.

The formulas for calculating the same heading membership M2 are as follows.

If no nominated track, Then Score=0

If |Δ Heading|>$A_2$, Then Score=0

If |Δ Heading|<$A_1$, Then Score=1

If $A_1$<|Δ Heading|<$A_2$, Then:

$$\text{Score} = \frac{A_1 - |\Delta.\text{Heading}|}{A_2 - A_1} + 1,$$

Figure 18:
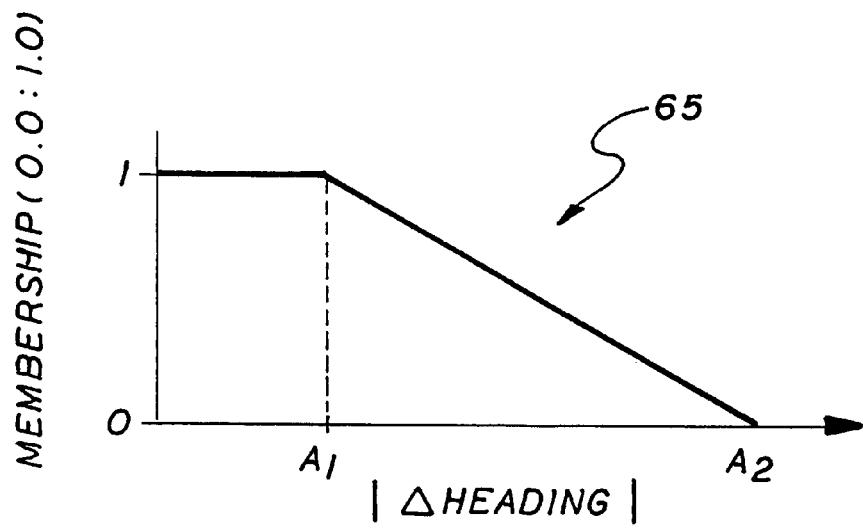
FIG. 18 is a graph of a portion of the formula for the derivation of the same heading membership function M2.

See graph 65 in FIG. 18

Where $A_1$ and $A_2$ are minimum and maximum angles.

The formulas for calculating the similar speed membership function M3 are as follows:

If no nominated track, Then Score=0

If ΔSpeed>$V_2$, Then Score=0

If ΔSpeed<$V_1$, Then Score=1

If $V_1$<ΔSpeed<$V_2$, Then:

$$\frac{V_1 - \Delta.\text{Speed}}{V_2 - V_1} + 1,$$

Figure 19:
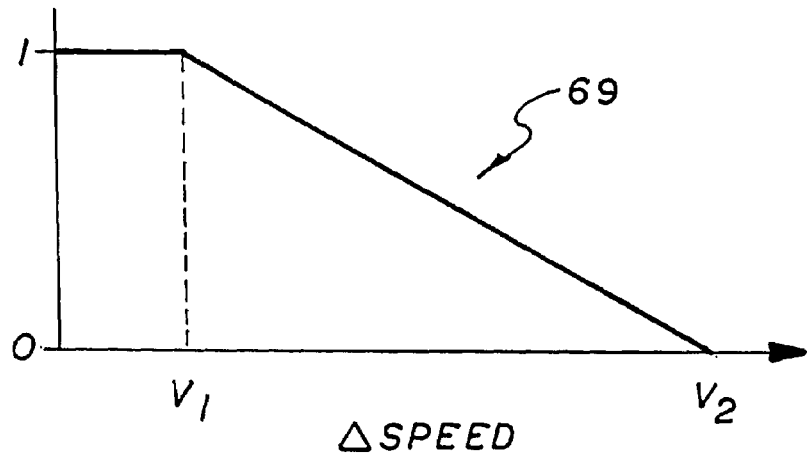
FIG. 19 is a graph of a portion of the formulas for the derivation of the similar speed membership function M3.
Figure 21:
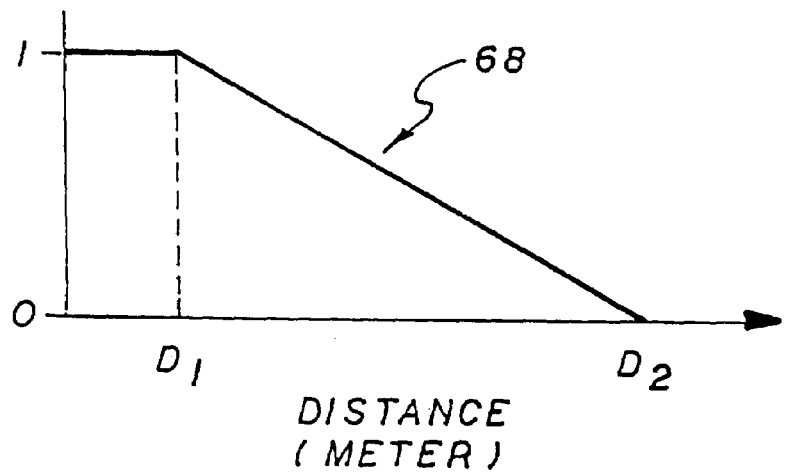
FIG. 21 is a graph of a portion of the formulas for the derivation of the off road scenario membership function M36.

See graph 69 in FIG. 19

Where $V_1$ and $V_2$ are minimum and maximum thresholds in speed.

The formulas for the calculation of Off road scenario-Closest Separation M34 are as follows:

Following is calculation for closest separation distance of the nominated track and a track of interest and the calculation of the Time-To-Go (TTG) to closest separation.

Obtain required terms from track $X_i$=Track of interest X (East) Position
$Y_i$=Track of interest Y (North) Position
$VX_i$=Track of interest X (East) Speed
$VY_i$=Track of interest Y (East) Speed
$X_n$=Track of interest X (East) Position
$Y_n$=Track of interest Y (North) Position
$VX_n$=Track of interest X (East) Speed
$VY_n$=Track of interest Y (North) Speed Calculate intermediate variables $$a = X_n - X_i$$

$$b = VX_n - VX_i$$

$$c = VY_n - VY_i$$

$$d = VY_n - VY_i$$

$$TTG = \frac{a*b + c*d}{b^2 + d^2}$$

If TTG is positive the vehicles are approaching other, calculations proceed. Calculate closest separation distance D.

$$D = \sqrt{(a+b*TTG)^2 + (c+d*TTG)^2}$$

With this information, the TTG Small function (M4) and TTG Similar (M5) function and M7 function can be determined.

If no nominated track, Then Score=0

If no common intersection, Then Score=0

If TTG>$T_2$, Then Score=0

If $T_1$<TTG<$T_2$, Then:

$$\text{Score} = \frac{T_1 - TTG}{T_2 - T_1} + 1,$$

Figure 20A:
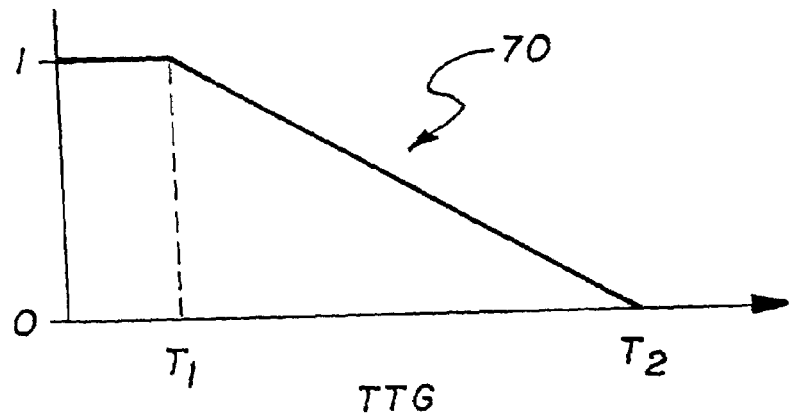
FIG. 20A is a graph of a portion of the formula for the derivation of the time-to-go (TTG) to a common intersection membership function M4.

See graph 70, FIG. 20A

If TTG<$T_1$, Then Score=1

The $T_1$ and $T_2$, values are minimum and maximums.

Figure 20B:
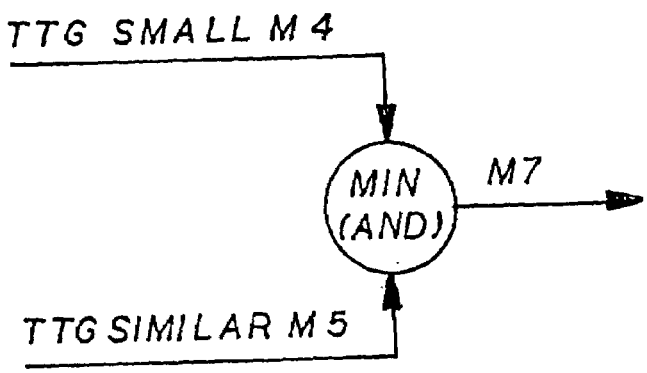
FIG. 20B presents a flow diagram for determining the intersection scenario M7.

Note that given the above, a determination whether the track is considered a confuser track (M7) can be determined (See FIG. 20B)

FIG. 22 illustrates rule 5 (M25), indicated by numeral 72, requests HRR on confuser tracks to get profiles to try to disambiguate tracks that are now in the open but in the past where ambiguous with other tracks. Rule 5 is as follows:
1. If a track is a confuser to a (nominated track OR track ambiguous with nominated track (M8) AND is in limbo (M17) AND
2. A helpful aspect (M12) is available AND not side pose (M32) AND
3. Track is not terrain screened (M14) AND track is in field of view (M33) AND not in discrete area (M38) AND
4. Track is not kinematically ambiguous AND
5. Track has good sigma range rate.

The score multiplied by W5 provides the rule 5 score M25.

Figure 23:
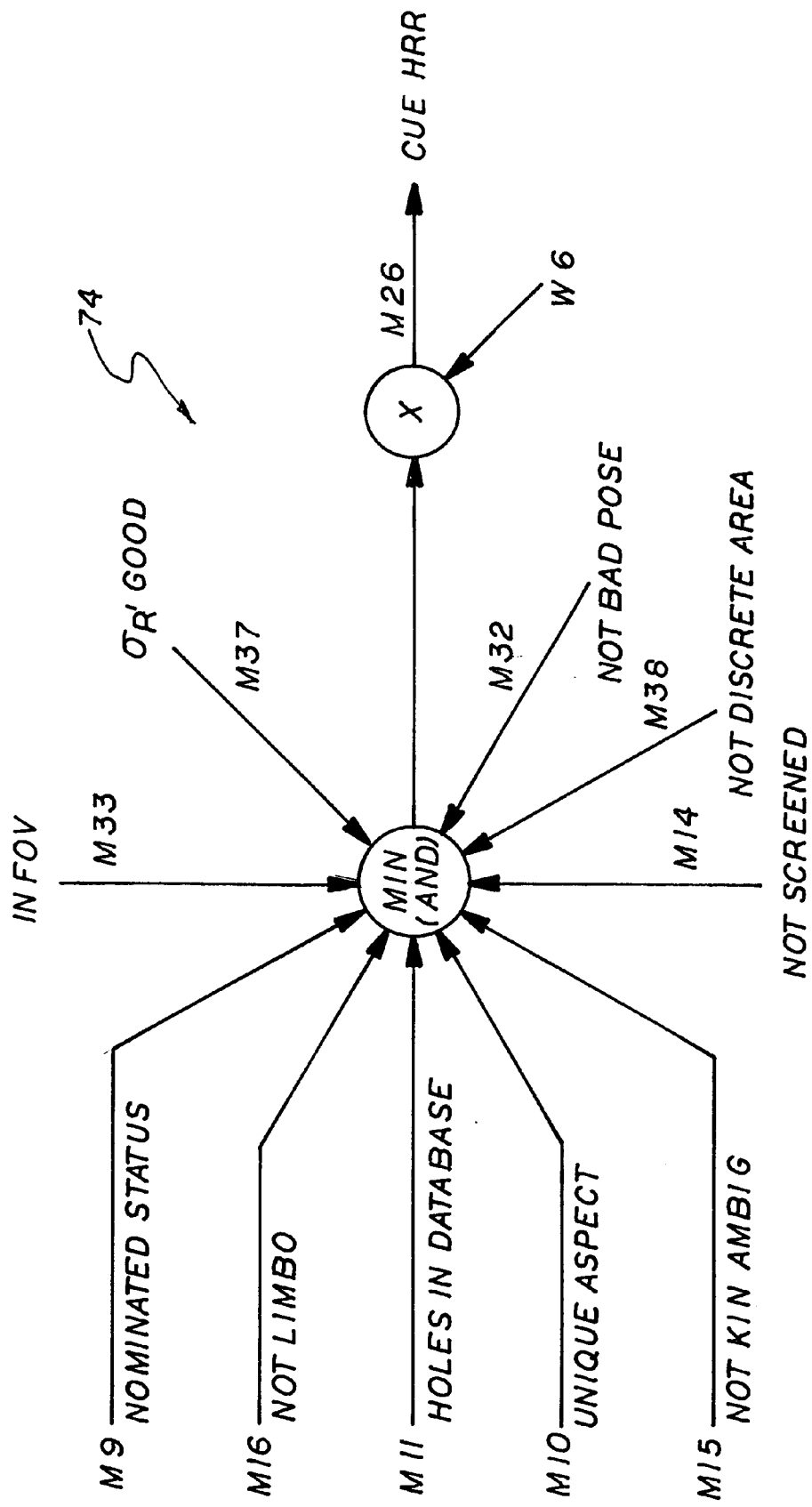
FIG. 23 is a flow diagram for rule numbers six M26.

FIG. 23 illustrates rule 6, and indicated by numeral 74, HRR on unambiguous nominated tracks to get profiles to fill-up the on-the-fly data base for fingerprinting of the important track for possible disambiguation, if required, at a later time. Rule 6 is as follows:
1. If nominated track (M9) OR track ambiguous with nominated track is not in limbo (M16) AND
2. Track has holes in "on the fly" data base (M11),
3. A unique/helpful aspect is available (M10) AND track not bad pose (M32) AND
4. Track is not terrain screened (M14) AND track is in field of view ((M33) AND not in discrete area (M38) AND
5. Track is not kinematically ambiguous (M15) AND
6. Track has good sigma range rate.

The score multiplied by W6 provides the rule 6 score M26
Following is the calculation of Holes in on the fly database (M11):

$$\text{Score} = 1 - \frac{\text{Number.of.profiles.in.regular.database.}}{360/\Delta\theta},$$

Figure 24:
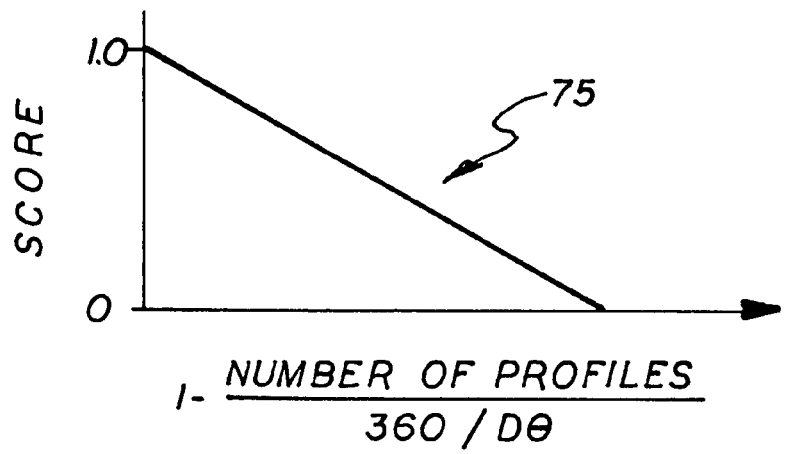
FIG. 24 is a graph of a portion of the formulas for the derivation of the holes in the "on the fly" database M11

See graph 75, FIG. 24,

Where $\Delta\theta$=Resolution of database.
Following is the calculation of the uniqueness of available aspect M10.

If D$\theta$<$A_1$, Score=0

If D$\theta$>$A_2$, Score=1

If $A_1$<D$\theta$<$A_2$. Then:

$$\text{Score} = \frac{D\theta - A_1}{A_2 - A_1},$$

Figure 25:
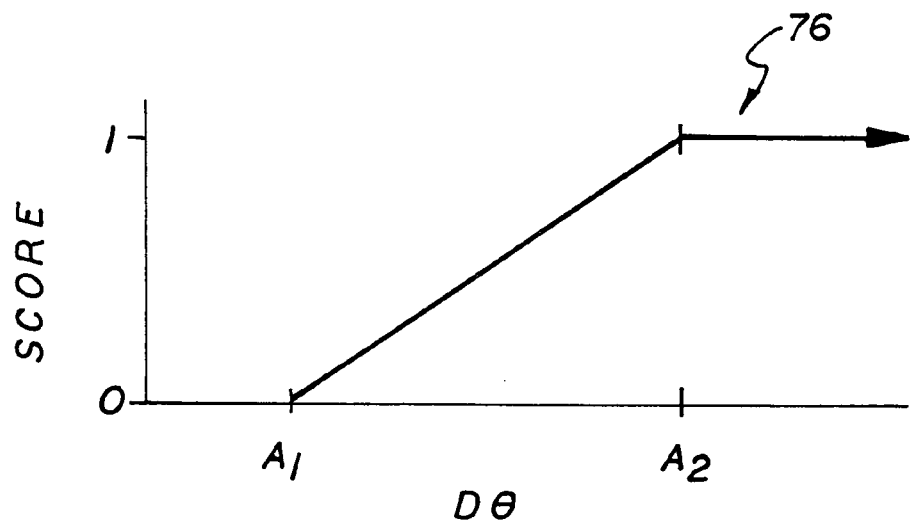
FIG. 25 is a graph of a portion of the formula for the derivation of the uniqueness of the available aspect membership function M10.

See graph 76, FIG. 25

Where $A_1$ is minimum angle threshold and $A_2$ is maximum angle threshold.

Figure 26:
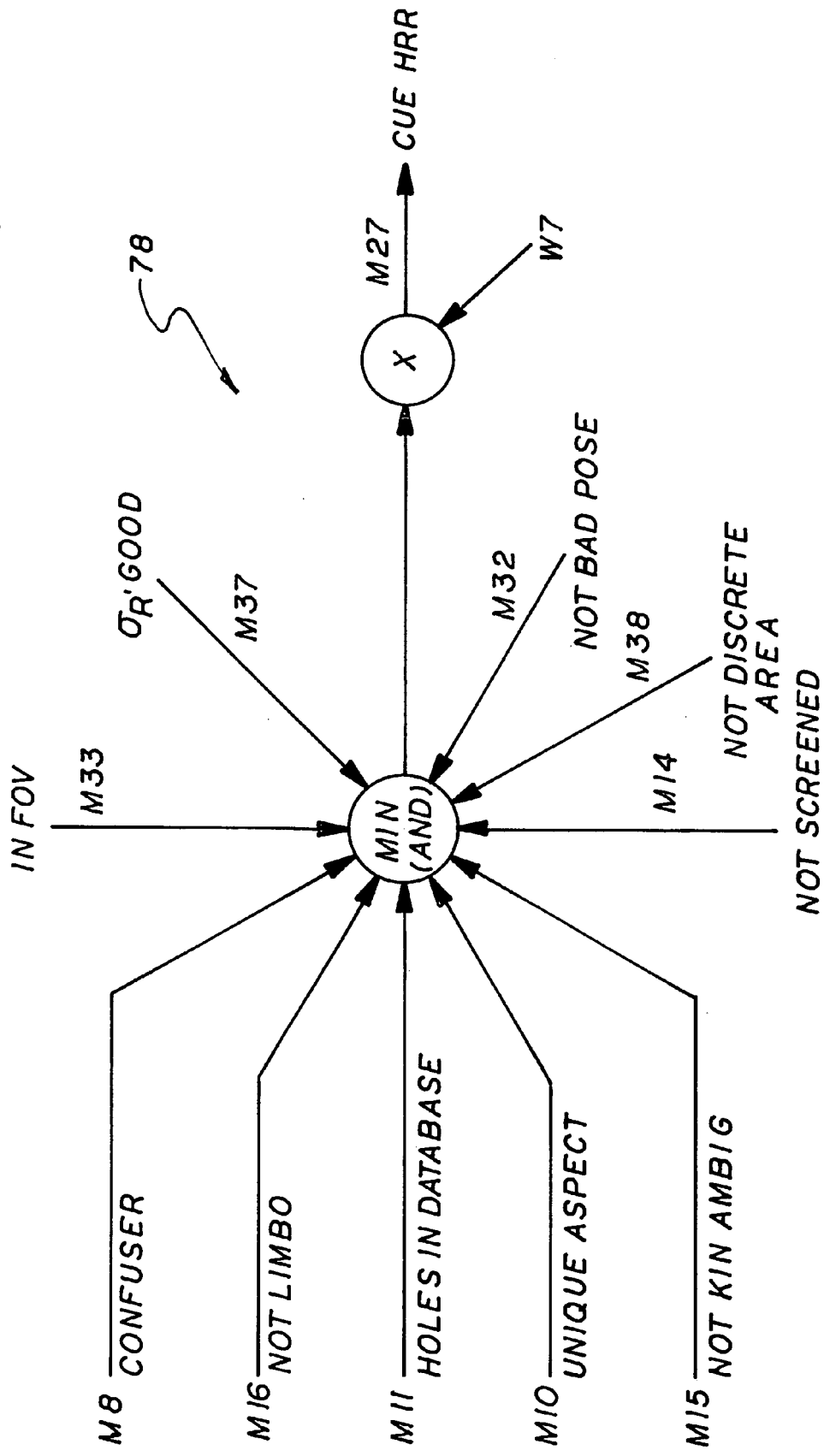
FIG. 26 is a flow diagram formula number seven M27.

FIG. 26 presents rule 7, indicated by numeral 78, requests HRR on unambiguous nominated tracks to get profiles to fill-up the on-the-fly data base for fingerprinting of the important track for possible disambiguation, if required, at a later time. Rule 7 is as follows:
1. If track is a confuser to (a nominated track OR track ambiguous with nominated track (M8) and is not in limbo. (M16) AND
2. Track has holes in "on the fly" data base (M11),
3. A unique/helpful aspect is available (M10) AND track not bad pose (M32) AND
4. Track is not terrain screened (M14) AND track is in field of view ((M33) AND not in discrete area (M38) AND
5. Track is not kinematically ambiguous (M15) AND
6. Track has good sigma range rate (M37).

The score multiplied by W7 provides the rule 7 score M27.
FIG. 27 presents rule 8, indicated by numeral 80, standard MTI data for background surveillance track who currently have marginal kinematic estimation accuracy for estimation improvement. Rule 8 is as folllows:
1. If track has poor kinematic quality (M13) and not nominated (M9) AND not terrain screened (M14) AND not in discrete area (M38) AND in field of view (M33).

The score multiplied by W8 provides the rule 8 score M28.
FIG. 28 presents rule 9 (M29), indicated by numeral 82, requests HRR on confuser tracks to get profiles to try to disambiguate background surveillance tracks that are now in the open but in the past where ambiguous with other tracks. Rule 9 is as follows:
1. If regular surveillance track is (not nominated or a confuser) in limbo, AND
2. A unique/helpful aspect is available (M12) and Not bad pose (M32), AND 3. Track is not terrain screened (M14) and track is in field of view (M33) and not in discrete area (M38), AND
4. Track is not kinematically ambiguous (M15), AND
5. Track has good sigma range rate (M37)

The score multiplied by W9 provides the rule 0 score M29.

FIG. 29 presents rule 10, indicated by numeral 84, requests HRR on unambiguous background surveillance tracks to get profiles to populate the on-the-fly data base for fingerprinting of the track for possible disambiguation at a later time. Rule 10 is as follows:
1. If a regular surveillance track (not nominated or a confuser) not in limbo (M16)
2. Has holes in "on the fly" data base (M11), AND
3. A unique/helpful aspect is available (M10) and not bad pose (M32), AND
4. Track is not terrain screened (M14) and track in field of view (M33) and not in discrete area (M38), AND
5. Track is not kinematically ambiguous (M15), AND
6. Track has good sigma range rate (M37).

The score multiplied by W10 provides the rule 10 score M30.

The weights W2 to W10 proved the system the ability to "tune" the process to place more or less emphasis on each individual rule's degree of influence, or weight, on the overall radar mode selection.

Thus it can be seen that rules 1, 2, 4 and 8 are attempts to improve kinematic quality by calculating position, heading, and speed uncertainty of the tracked vehicles and providing a first set of scores therefore. Rules 6, 7 and 10 attempt to collect required data needed for future required disambiguations by calculating the usefulness and neediness of identification measurements of all tracked vehicles and providing a second set of scores therefore. Rules 3, 5 and 9 are attempts to collect required data needed for immediate disambiguation by calculating the usefulness and neediness of identification measurements of all ambiguous tracked vehicles and providing a third set of scores therefore. The highest score of all the rules determines which mode the radar operates in. With the above process, the effectiveness of the radar system is is greatly improved over traditional techniques.

Figure 30:
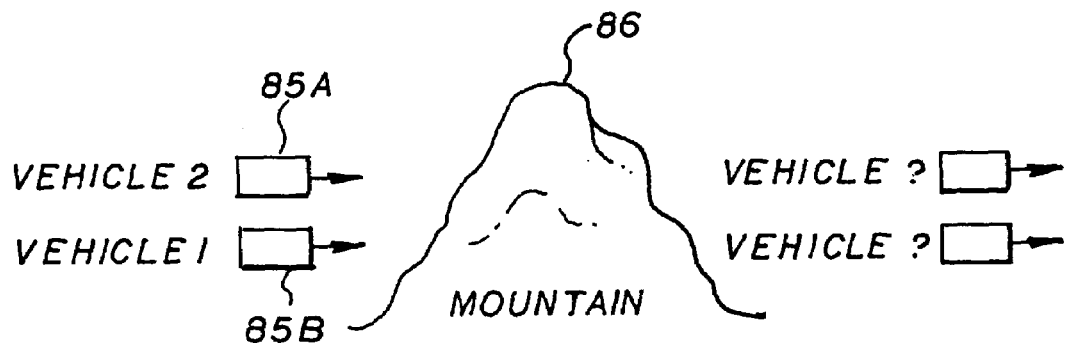
FIG. 30 is a depiction of the terrain screening scenario causing an ambiguity.
Figure 31:
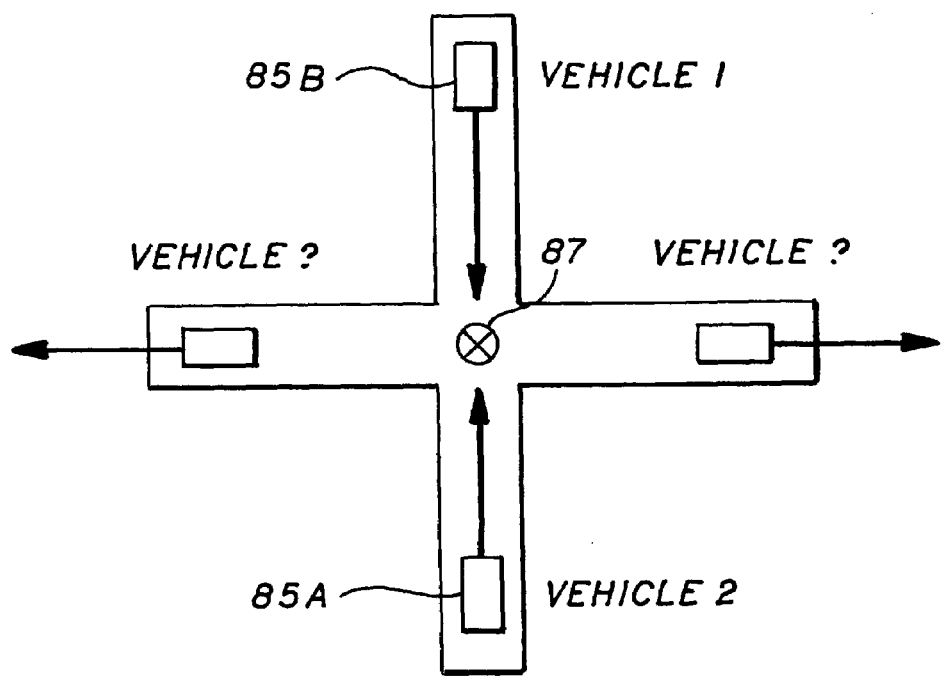
FIG. 31 is a depiction of the road intersection scenario causing an ambiguity.

The subject of this invention is the FATS program, which helps resolve kinematically ambiguous tracks. Referring to FIG. 30, the first typical problem occurs when two vehicles 85 and 85B approach and disappear behind foliage or terrain such as a mountain 86, and then reemerges into view. The question is have the the two vehicles swapped their extrapolated tracks. Referring to FIG. 31, a more common problem is when the two vehicles, 85A and 85B, approach an intersection 87. At the intersection 87, the two vehicles are so close that it is impossible to distinguish between the two. If both vehicles turn, the problem again becomes identifying which vehicle is which. The FATS program reduces the possibility of the two vehicles remaining ambiguous by learning the radar signatures of the two vehicles at various angles to the aircraft prior to the point where they are so close that they become ambiguous.

Figure 32:
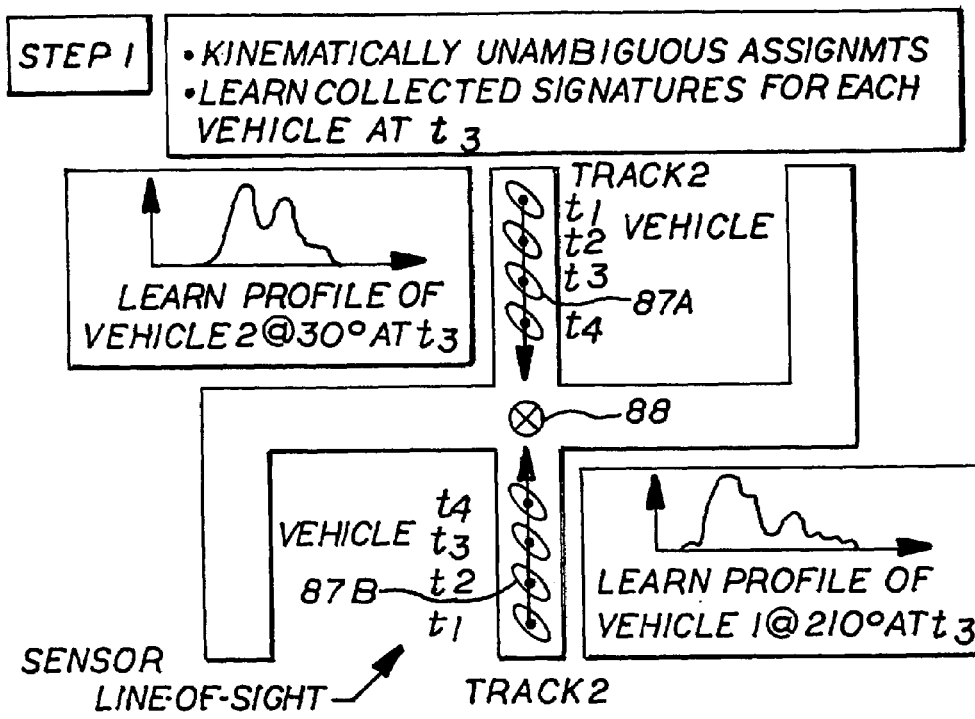
FIG. 32 is a depiction of a first step in the elimination of an ambiguity in a road intersection scenario.
Figure 33:
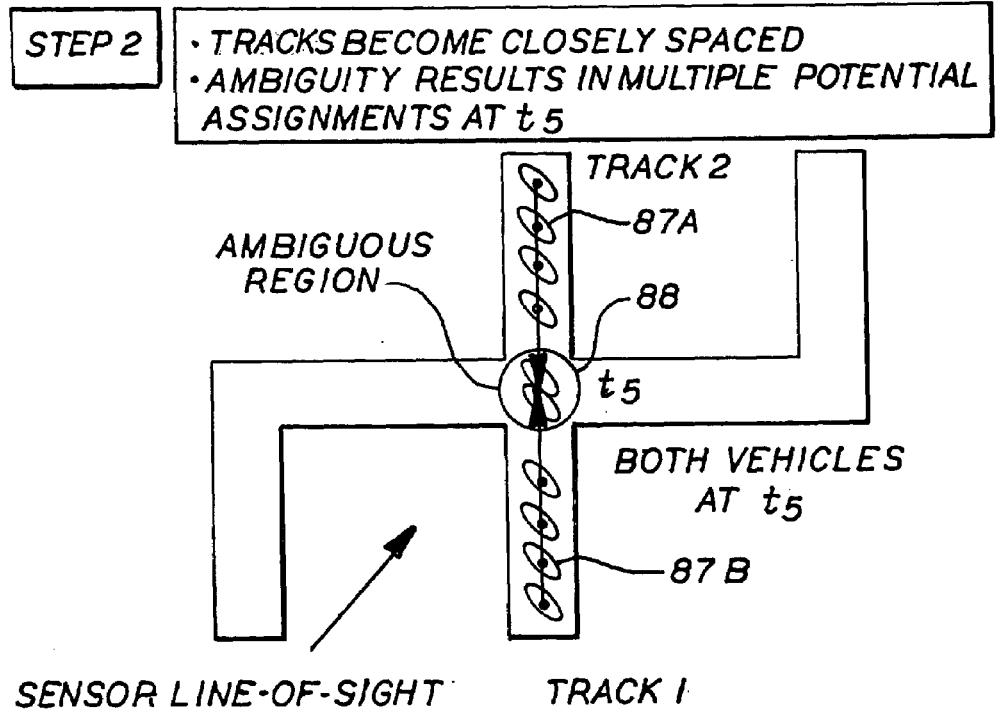
FIG. 33 is a depiction of a second step in the elimination of an ambiguity in a road intersection scenario.
Figure 34:
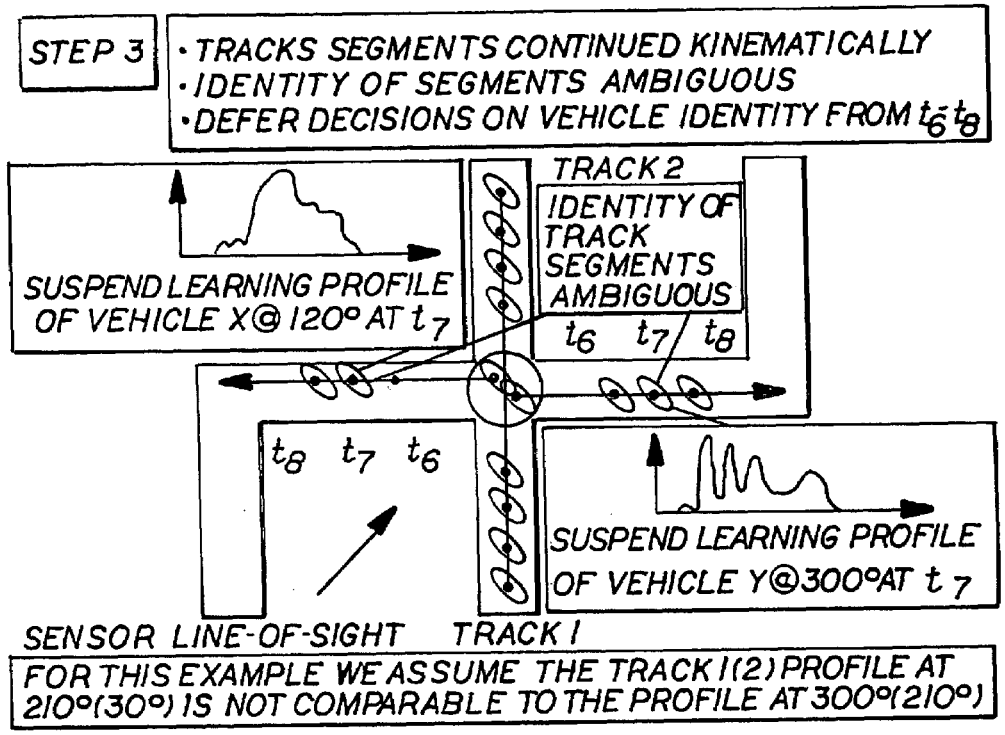
FIG. 34 is a depiction of a third step in the elimination of an ambiguity in a road intersection scenario.
Figure 35:
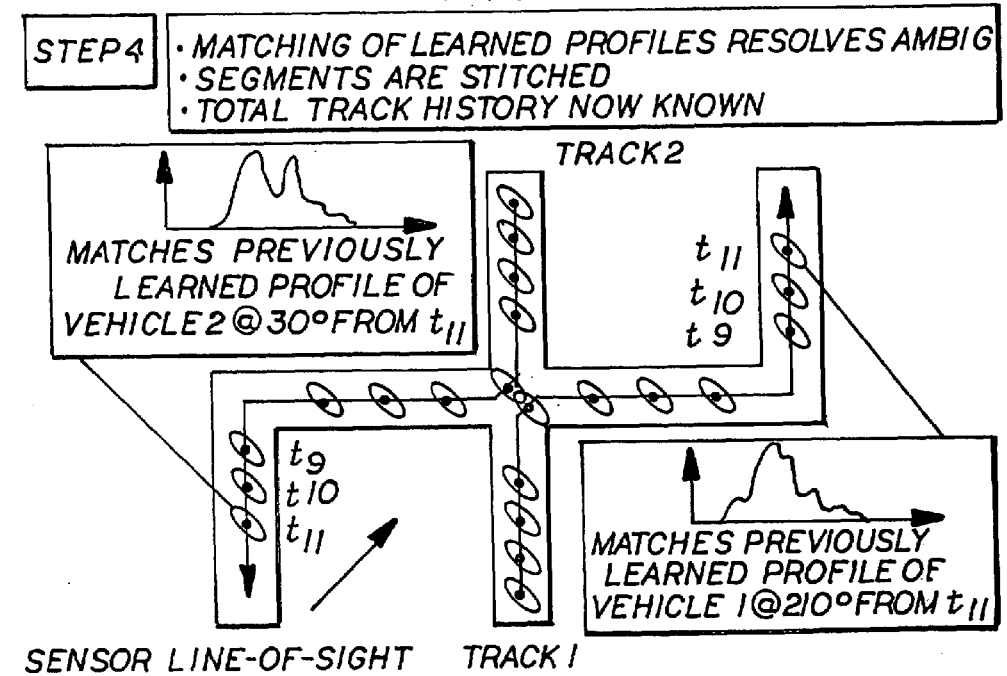
FIG. 35 is a depiction of a fourth step in the elimination of an ambiguity in a road intersection scenario.
Figure 36:
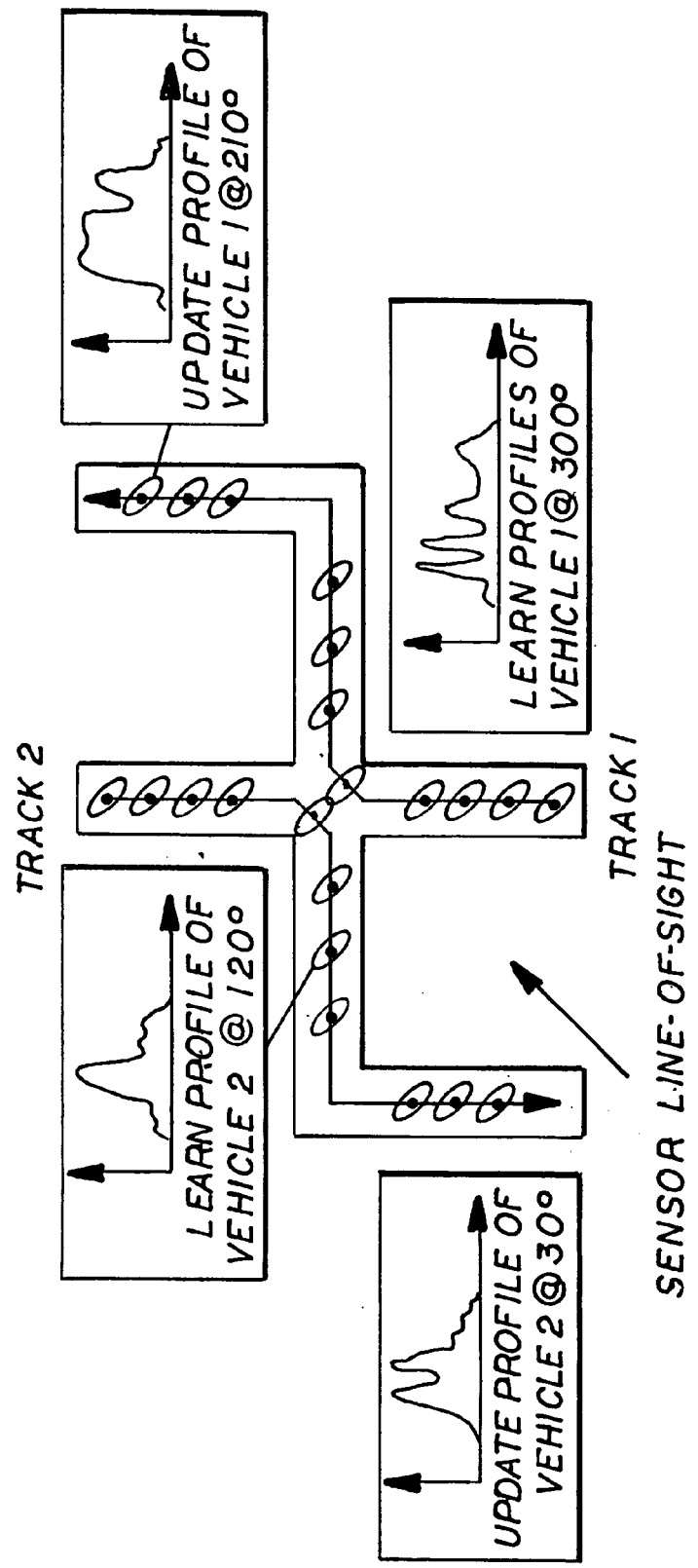
FIG. 36 is a depiction of a fifth step in the elimination of an ambiguity in a road intersection scenario.

Thus referring to FIG. 32, when the two vehicles approach each other, the radar profiles or signatures are obtained and stored in the "on the fly" data base; in this case at time equals $t_3$. Thus vehicle 1 is at 210 degrees and vehicle 2 is at 30 degrees. Referring to FIG. 33, at $t_5$ the vehicles have become ambiguous. In FIG. 35, the vehicles have now separated, but the track segments are ambiguous. However, at $t_7$ radar profiles are again recorded. Referring to FIG. 36, the vehicles have now turned again and at $t_{11}$ profile matches can be made with profiles collected at $t_7$ as shown in FIG. 35 and the vehicles identified. The profile matching is accomplished by the root mean square test, however other techniques can be used. FIG. 36, the FATS continues to record radar profiles.

Figure 37:
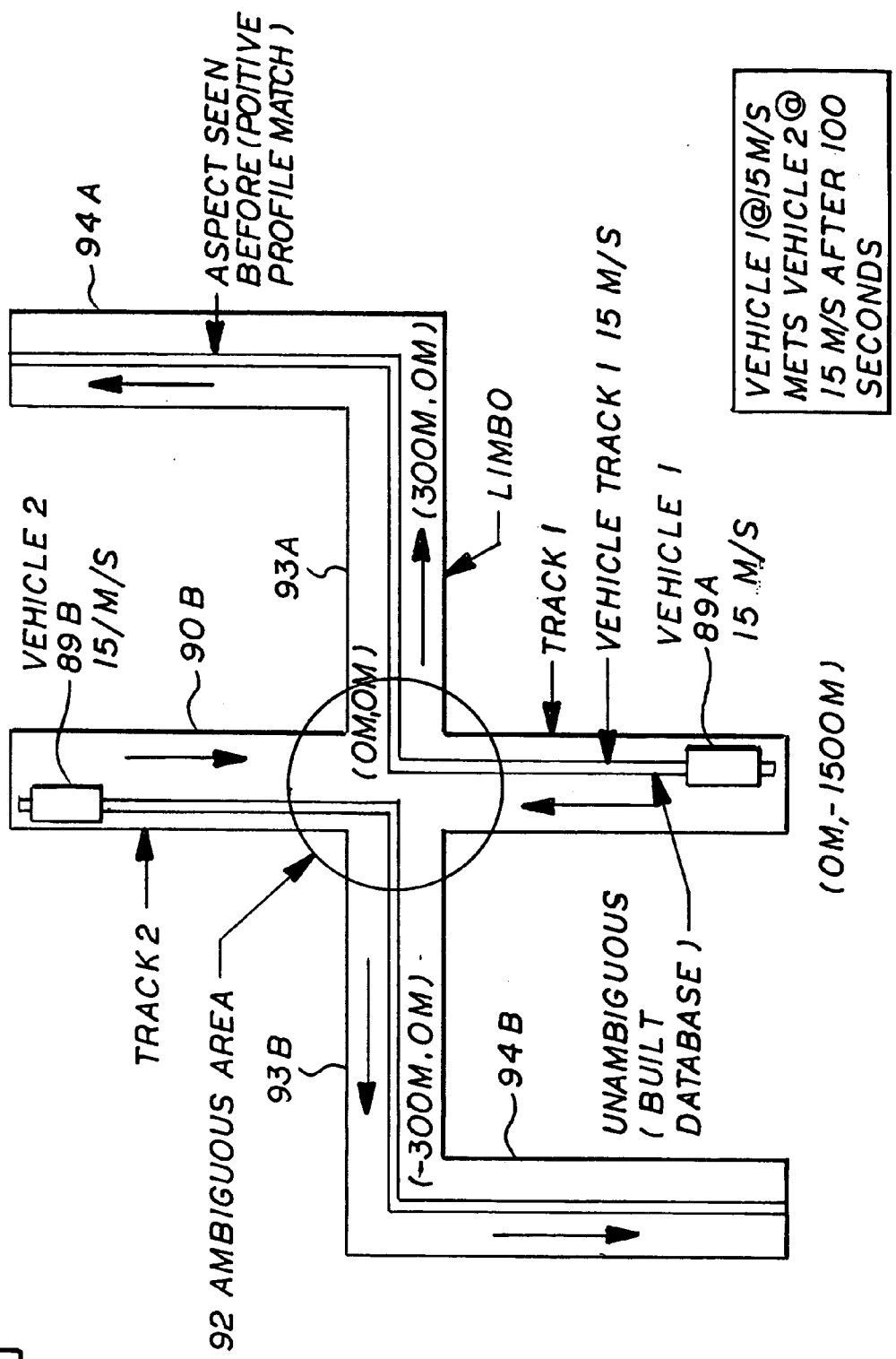
FIG. 37 is first test case of the intersection scenario.

Referring to FIG. 37, is an actual test scenario (case 1) wherein 2 vehicles 89A and 89B approach each other on tracks 90A and 90B, respectfully. The FATS builds a database on both vehicles 89A and 89B as they approach the ambiguous area 92. Both vehicles 89A and 89B enter the ambiguous area 92 and travel on segments 93A and 93B and then turn on to segments 94A and 94B. While on segments 93A and 93B they are in limbo, because no profile exits for the vehicles in this position. However, a match is made when vehicle 98A travels over segment 94A. The match verified that there is no kinematic miss-association back at the intersection, no track tag change (the FATS system miss-identifies the vehicle tracks), there is a positive match, and all "on the fly" databases are converted to unambiguous.

Referring to FIG. 38, is second actual test scenario (case 2) wherein 2 vehicles 96A and 86B approach each other on tracks 97A and 97B, respectfully. The FATS system builds a database on both vehicles 96A and 96B as they approach the ambiguous area 98. Both vehicles 96A and 96B enter the ambiguous area 98 and travel on segments 99A and 99B and then turn on to segments 100A and 100B. While on segments 100A and 100B they are in limbo, because no profile exits for the vehicles in this position. When vehicle 96A turns on segment 102A a no match is made because vehicle 96A is moving toward the sensor. However, vehicle 96B turns on to segment 102B, an attempted comparison of vehicle's 96B profile will fail. This of course will indicate that vehicle 96A is on segment 102A. Here there is no kinematic miss-association back at the intersection, no track tag change is needed (the FATS system did not mis-identify the vehicle tracks), there is a positive match, and all "on the fly" data bases are converted to unambiguous FIG. 39 is third actual test scenario (case 3) wherein 2 vehicles 106A and 106B approach each other on segments 107A and 107B, respectfully. The FATS system builds a database on both vehicles 106A and 106B as they approach the ambiguous area 108. Thereafter vehicle 106A turns on to segment 110A and then on to segment 112A. However, the FATS system has assumed that vehicle 106A has turned on to segment 110B and then on to segment 112B indicated by track 113. On the other hand, vehicle 106B travels down segment 110B and onto segment 112B. However, the FATS system has assumed that vehicle 106B is on track 114. When the FATS system compares the profile of vehicle 106B on segment 112B to the profile taken of vehicle 106A on segment 107A, it will determine that the tracks of vehicle 106A and 106B must be exchanged. Here there is a kinematic miss-association back at the intersection, and a track tag change is required (the FATS system miss-identifies the vehicle tracks), there is a negative profile match, and all "on the fly" data bases are converted.

FIG. 40, is fourth actual test scenario (case 4) wherein 2 vehicles 116A and 116B approach each other on segments 117A and 117B, respectfully. The FATS system builds a database on both vehicles 116A and 116B as they approach the ambiguous area 118. Thereafter vehicle 116A turns on to segment 120A and then on to segment 122A. However, the FATS system has assumed that vehicle 116A has turned on to segment 120B and then on to segment 112B indicated by track 123. On the other hand, vehicle 116B travels down segment 120B and onto segment 122B. However, the FATS system has assumed that vehicle 116B is on track 124. When the FATS system compares the profile of vehicle 116B on segment 122A to the profile taken of vehicle 110A on segment 117A, it will determine that the tracks of vehicle 116A and 116B must exchanged. Here there was a kinematic miss-association back at the intersection, and therefor a track tag change is required (the FATS system miss-identifies the vehicle tracks), there is a positive profile match, and all "on-the-fly" databases are converted.

Figure 44:
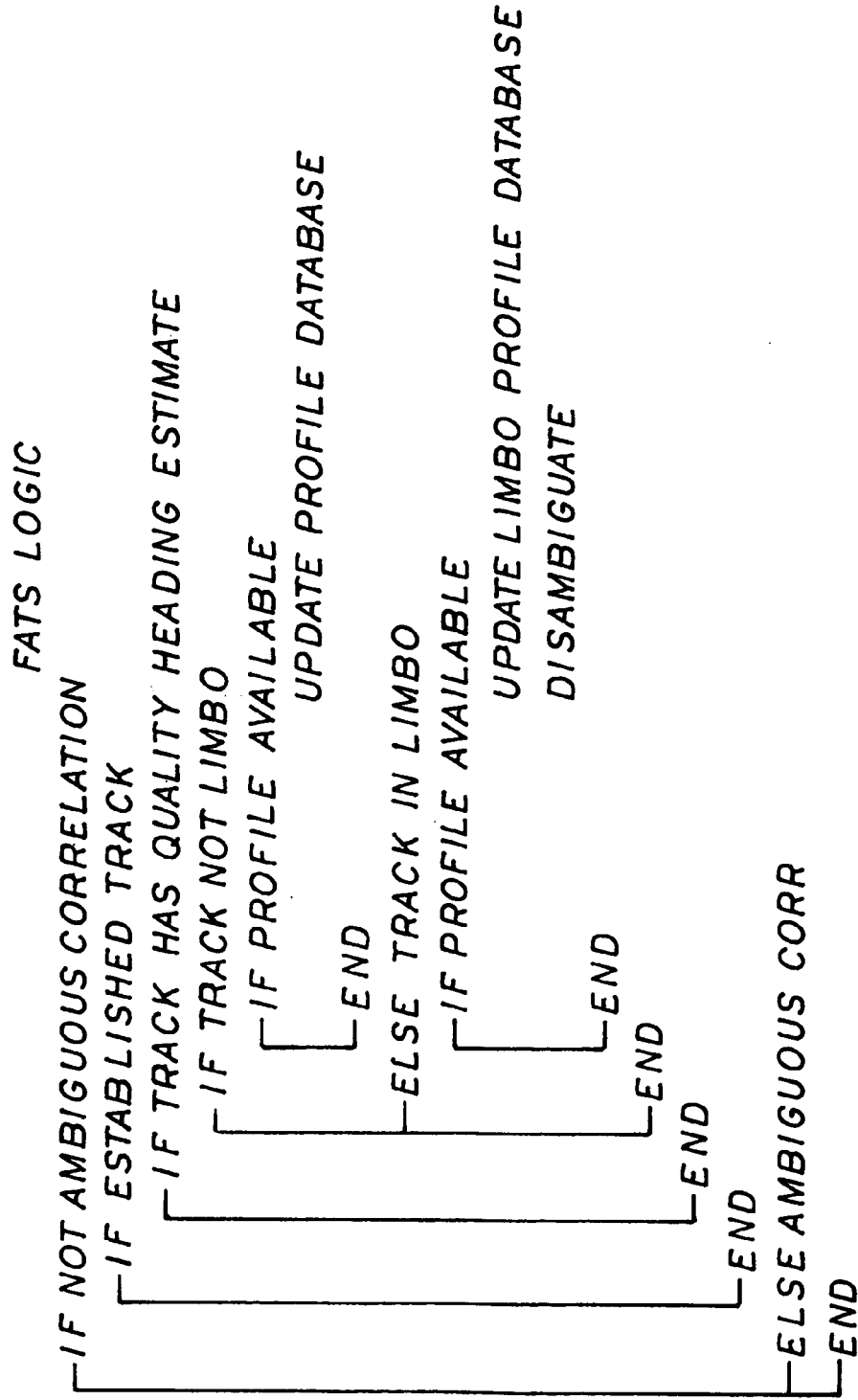
FIG. 44 is a top-level control chart of the feature added track stitcher FATS.
Figure 45:
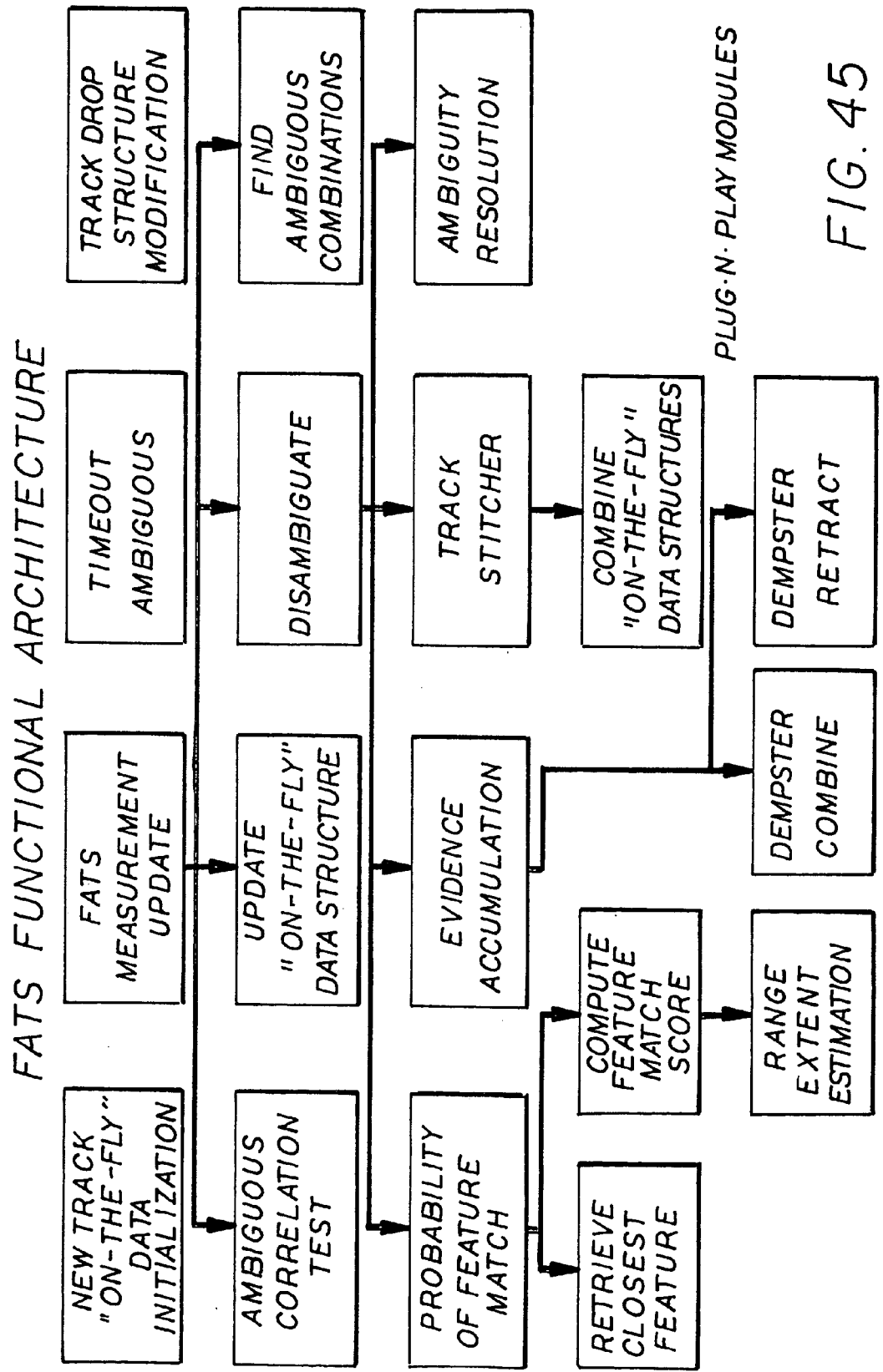
FIG. 45 is a FATS system Functional architecture diagram.

FIG. 41 presents a chart summarizing the results of the four cases. The FIGS. 42, 43 and 44 present a summary of the FATS system logic. The Functional Architecture for FATS is shown in FIG. 45. Descriptions of the individually numbered elements are as follows:

Step 130 New track "On the fly" Data Initiation—Updates the tracks in the FATS database with new measurements received.

Step 132 Fats Measurement Up Dates-Declares tracks' ambiguous after coasting (with no updates) for a specified time period.

Step 134 Timeout Ambiguous—Modifies the database for a track that has been dropped (removes associations with other tracks within the database).

From Step 132:

Step 136 Determines when tracks become ambiguous with each other in confusing kinematic situations Step 138 Ambiguous Correlation Test-Updates the "on-the-fly" database with a measurement profile if the track is unambiguously correlated to the measurement it is paired with.

Step 140 Update "On the fly" Data Structures—The process of disambiguating tracks that have interacted with other confuser tracks. The process determines whether the current profile collected within the current measurement shows that it came from the same vehicle or a different one. Action is taken if a same or different declaration is found.

Step 142 Disambiguates—Initializes FATS data for a newly established track.

Step 144 Find Ambiguous Combinations—Finds potential combinations of ambiguous tracks for possible association.

From Step 142:

Step 146 Probability Of Feature Match—Determines the probability of a match using feature matching.

From Step 156:

Step 148 Retrieve Closest Feature—Retrieves the closest HRR profiles within the database that matches the aspect of the track Step 150 Compute Feature Match Score-Probability Of Feature Match-Computes the mean square error score for the profile extracted from the tracks' database and the profile within the current measurement Step 152 Range Extent Estimation Evidence Accumulation—Estimates the range extent of the signature within the HRR profile. This is used to validate whether the HRR profile matches an estimate of the targets length based on the tracks' pose.

From Step 142

Step 154 Evidence Accumulation—Accumulates same/difference evidence for each track pairing combinations as HRR profile features are collected for that track.

Step 156 Perform the Dempster—Shaeffer combine. This function uses the correlation probabilities returned when comparing profiles and updates the combined evidence state. The combined evidence state is then used to determine whether the vehicle is the same or different during the disambiguation process.

Step 158 Dempster Retract—The Dempster retract un-does a previous combine if necessary.

Step 160 Track Stitcher—"Stitches", or pieces together tracks and determines whether an "id" swap is necessary between two tracks.

Step 162 Combine "On the fly" Databases—Combines the profiles collected in the tracks' "limbo" database with the tracks' "on-the-fly" database.

From Step 142

Step 164 Ambiguity Resolution—Resolves ambiguities between tracks using the process of elimination. Operates on the track's ambiguity matrix.

Thus it can be seen that the FATS system, by means of storing vehicle profiles in a "on the fly" data base can be used to can greatly reduce ambiguities in tracking vehicles and the like, when such vehicles come in close contact with others.

While invention has been described with reference to a particular embodiment, it should be understood that the embodiment is merely illustrative, as there are numerous variations and modifications, which may be made by those skilled in the art. Thus, the invention is to be construed as being limited only by the spirit and scope of the appended claims.

INDUSTRIAL APPLICABILITY

The invention has applicability to electronic war equipment industry.

The invention claimed is:

1. A process for tracking a moving targeted vehicle from a remote sensor platform comprising the steps of:
   tracking the targeted vehicle and periodically recording its radar signature until its identity becomes ambiguous and;
   tracking the target after it has left its ambiguous state and periodically recording its radar signature; and
   comparing the recorded radar signatures prior to the targeted vehicle becoming ambiguous to the recorded radar signature taken after the targeted vehicle has left its ambiguous state and determining that the targeted vehicle now tracked is the same as the targeted vehicle being tracked prior to becoming ambiguous.

2. The process as set forth in claim 1 wherein:
   the step of tracking the targeted vehicle and periodically recording its radar signature until its identity becomes ambiguous includes step of recording its aspect to the sensor platform; and
   comparing the recorded radar signatures prior to the targeted vehicle becoming ambiguous to the recorded radar signatures taken after the targeted vehicle has left its ambiguous state and determining that the targeted vehicle now tracked is the same as the targeted vehicle being tracked prior to becoming ambiguous includes the step comparing recorded signatures only at similar aspects to the platform.

3. The process as set forth in claim 1, wherein there is at least one other vehicle moving in proximity to the targeted vehicle, the process including the additional steps of:
   tracking and periodically recording its radar signature of the at least one other vehicle until its identity becomes ambiguous with the targeted vehicle;

tracking the at least one other vehicle after it has left its ambiguous state and periodically recording its radar signature and comparing the recorded radar signatures prior to the at least one other vehicle becoming ambiguous to the recorded radar signature taken after the at least one other vehicle has left its ambiguous state and determining that the at least one other vehicle now tracked is the same as the at least one other vehicle being tracked prior to becoming ambiguous.

4. A process for tracking a moving targeted vehicle and at least one other moving vehicle from a remote sensor platform comprising the steps of:

tracking the targeted vehicle and at least one other targeted vehicle until their identities becomes ambiguous with each other and periodically recording their radar signatures;

tracking the target vehicle and at least one other vehicle after they have left their ambiguous states and periodically recording their radar signatures;

determining the identity of the targeted vehicle and at least one other vehicle after they have left their ambiguous states by comparing the recorded radar signatures of the targeted vehicle and at least one other targeted vehicle prior to their becoming ambiguous with each other to the recorded radar signatures of the targeted vehicle and at least one other vehicle after they have left their ambiguous states in order to find a match.

5. The process as set forth in claim 4 including the steps of:

recording the aspect of the targeted vehicle and the at least one other vehicle when recording all radar signatures; and comparing the recorded radar signatures only when the aspects of the vehicles are similar.

6. The process as set forth in claim 5 wherein:

the step of tracking the targeted vehicle and periodically recording its radar signature until its identity becomes ambiguous includes step of recording its aspect to the sensor platform; and comparing the recorded radar signatures prior to the targeted vehicle becoming ambiguous to the recorded radar signatures taken after the targeted vehicle has left its ambiguous state and determining that the targeted vehicle now tracked is the same as the targeted vehicle being tracked prior to becoming ambiguous includes the step comparing recorded signatures only at similar aspects to the platform.

7. The process as set forth in claim 5, wherein there is at least one other vehicle moving in proximity to the targeted vehicle, the process including the additional steps of:

tracking and periodically recording its radar signature of the at least one other vehicle until its identity becomes ambiguous with the targeted vehicle;

tracking the at least one other vehicle after it has left its ambiguous state and periodically recording its radar signature and comparing the recorded radar signatures prior to the at least one other vehicle becoming ambiguous to the recorded radar signature taken after the at least one other vehicle has left its ambiguous state and determining that the at least one other vehicle now tracked is the same as the at least one other vehicle being tracked prior to becoming ambiguous.

8. The process as set forth in claim 4 including the steps of:

recording the aspect of the targeted vehicle and the at least one other vehicle when recording all radar signatures; and comparing the recorded radar signatures only when the aspects of the vehicles are similar.

9. A process for tracking a moving targeted vehicle by radar from a from a remote sensor platform comprising the steps of:

determining if the targeted vehicle is likely to become ambiguous as to its identification by the radar;

if the targeted vehicle is likely to become ambiguous, tracking the targeted vehicle and periodically recording its radar signature until its identity becomes ambiguous and;

tracking the target after it has left its ambiguous state and periodically recording its radar signature; and comparing the recorded radar signatures prior to the targeted vehicle becoming ambiguous to the recorded radar signature taken after the targeted vehicle has left its ambiguous state and determining that the targeted vehicle now tracked is the same as the targeted vehicle being tracked prior to becoming ambiguous.

10. A process for tracking a moving targeted vehicle and at least one other moving vehicle by radar from a remote sensor platform comprising the steps of:

determining if the targeted vehicle is likely to become ambiguous as to its identification by the radar;

if the targeted vehicle is likely to become ambiguous with the at least one other targeted vehicle, tracking the targeted vehicle and at least one other targeted vehicle periodically recording their radar signatures until their identities becomes ambiguous with each other and;

tracking the target vehicle and at least one other vehicle after they have left their ambiguous states and periodically recording their radar signatures;

determining the identity of the targeted vehicle and at least one other vehicle after they have left their ambiguous states by comparing the recorded radar signatures of the targeted vehicle and at least one other targeted vehicle prior to their becoming ambiguous with each other to the recorded radar signatures of the targeted vehicle and at least one other vehicle after they have left their ambiguous states in order to find a match.

* * * * *